United States Patent
Yamada et al.

(10) Patent No.: US 8,497,646 B2
(45) Date of Patent: Jul. 30, 2013

(54) CONTROLLER FOR AC ELECTRIC MOTOR AND ELECTRIC POWERED VEHICLE

(75) Inventors: Kenji Yamada, Komaki (JP); Toshifumi Yamakawa, Okazaki (JP); Toshikazu Ono, Toyota (JP); Yutaka Kuromatsu, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/144,040

(22) PCT Filed: Feb. 23, 2009

(86) PCT No.: PCT/JP2009/053148
§ 371 (c)(1),
(2), (4) Date: Jul. 11, 2011

(87) PCT Pub. No.: WO2010/082368
PCT Pub. Date: Jul. 22, 2010

(65) Prior Publication Data
US 2011/0273125 A1 Nov. 10, 2011

(30) Foreign Application Priority Data
Jan. 14, 2009 (JP) ................................ 2009-006005

(51) Int. Cl.
*H02P 7/29* (2006.01)
*H02P 6/08* (2006.01)

(52) U.S. Cl.
USPC ....... 318/400.09; 327/100; 327/334; 327/184

(58) Field of Classification Search
USPC ................. 318/503, 689, 969, 118, 119, 139, 318/140, 700, 400, 599; 327/100, 334, 184
See application file for complete search history.

(56) References Cited

U.S. PATENT DOCUMENTS

| | | | | |
|---|---|---|---|---|
| 5,627,441 A * | 5/1997 | Sakurai et al. | ................ | 318/599 |
| 6,348,775 B1 * | 2/2002 | Edelson et al. | ................ | 318/727 |
| 7,126,309 B1 * | 10/2006 | Takeuchi et al. | ................ | 318/811 |
| 7,199,540 B2 * | 4/2007 | Yaguchi | ........................ | 318/432 |
| 8,269,439 B2 * | 9/2012 | Itoh | ........................ | 318/400.09 |
| 2007/0241715 A1 * | 10/2007 | Fujiwara et al. | ................ | 318/609 |
| 2007/0278986 A1 * | 12/2007 | Okamura | ...................... | 318/798 |
| 2010/0013421 A1 * | 1/2010 | Itoh | ........................ | 318/400.09 |

FOREIGN PATENT DOCUMENTS

| | | | |
|---|---|---|---|
| EP | 2131489 A1 * | 12/2009 | |
| JP | 2002-112596 A | 4/2002 | |
| JP | 2003-309993 A | 10/2003 | |
| JP | 2007-306699 A | 11/2007 | |
| JP | 2008-236853 A | 10/2008 | |
| JP | 2008-253000 A | 10/2008 | |
| WO | 2008/120540 A1 | 10/2008 | |
| WO | WO 2008120540 A1 * | 10/2008 | |

* cited by examiner

*Primary Examiner* — Eduardo Colon Santana
*Assistant Examiner* — Said Bouziane
(74) *Attorney, Agent, or Firm* — Sughrue Mion, PLLC

(57) ABSTRACT

An AC electric motor, an inverter and a controller are mounted on an electric powered vehicle. The controller includes a voltage deviation calculating unit, a modulation factor calculating unit, and a mode switching determination unit. The voltage deviation calculating unit calculates a voltage deviation between a first voltage command when the rectangular wave voltage control is executed and a second voltage command when pulse width modulation control is executed, by inputting a current deviation to a voltage equation of the AC electric motor. Modulation factor calculating unit calculates the modulation factor based on the first voltage command and the voltage deviation. The mode switching determination unit determines whether or not control mode of the AC electric motor from the rectangular wave voltage control to the pulse width modulation control is necessary, based on the modulation factor.

12 Claims, 11 Drawing Sheets

FIG.2

|  | PWM CONTROL MODE | | RECTANGULAR WAVE VOLTAGE CONTROL MODE |
|---|---|---|---|
| CONTROL METHOD | SINE WAVE PWM | OVER MODULATION PWM | RECTANGULAR WAVE (1 PULSE) |
| INVERTER OUTPUT VOLTAGE WAVEFORM | FUNDAMENTAL WAVE COMPONENT | FUNDAMENTAL WAVE COMPONENT | FUNDAMENTAL WAVE COMPONENT |
| MODULATION FACTOR | 0 TO APPROX. 0.61 | MAX VALUE OF SINE WAVE PWM TO 0.78 | 0.78 |
| CHARACTERISTICS | SMALL TORQUE FLUCTUATION | IMPROVED OUTPUT IN MIDDLE SPEED RANGE | IMPROVED OUTPUT IN HIGH SPEED RANGE |

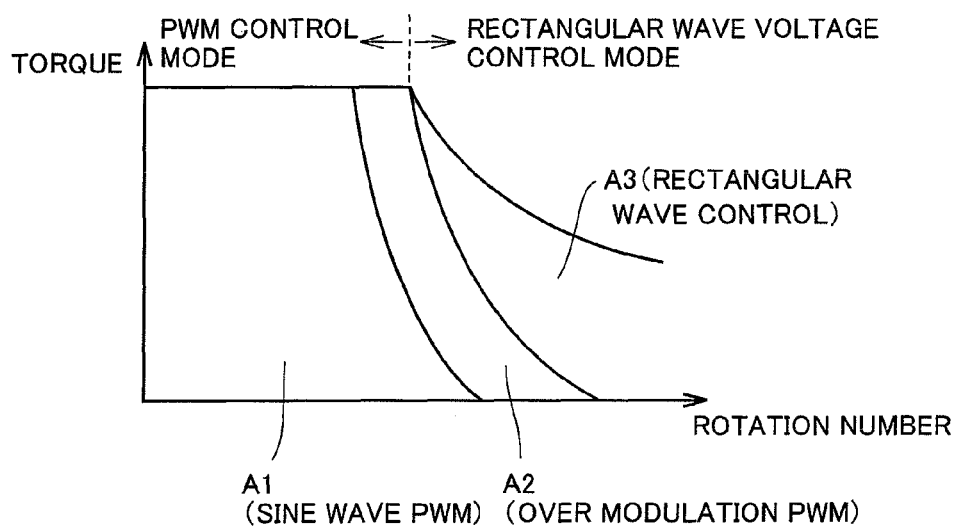

FIG.3

CONTROLLER FOR AC ELECTRIC MOTOR AND ELECTRIC POWERED VEHICLE

CROSS REFERENCE TO RELATED APPLICATIONS

This application is a National Stage of International Application No. PCT/JP2009/053148 filed on Feb. 23, 2009, which claims priority from Japanese Patent Application No. 2009-006005, filed on Jan. 14, 2009, the contents of all of which are incorporated herein by reference in their entirety.

TECHNICAL FIELD

The present invention relates to a controller for an AC electric motor and to a vehicle. More specifically, the present invention relates to a controller for an AC electric motor for changing control mode of the AC electric motor based on a modulation factor, as well as to an electric powered vehicle mounting the controller and the AC electric motor.

BACKGROUND ART

In order to control driving of an AC electric motor using a DC power source, a method of driving using an inverter has been adopted. Switching of the inverter is controlled by a driving circuit. PWM (Pulse Width Modulation) control and rectangular wave voltage control (also referred to as rectangular wave control), for example, have been known for inverter control.

Japanese Patent Laying-Open No. 2007-306699 (Patent Document 1) discloses a motor drive system allowing switching between the PWM control and the rectangular wave control. The motor drive system includes a control circuit that executes the following control. When a d-axis current before the control is switched to the rectangular wave control is smaller than a command value, the control circuit corrects phase of a control voltage vector such that the d-axis current comes closer to the corresponding command value. The control circuit executes the rectangular wave control based on the corrected phase of the control voltage vector. When modulation factor is higher than a prescribed value, the control circuit switches the inverter control mode from the PWM control to the rectangular wave control. On the other hand, if the modulation factor is not higher than the prescribed value and q-axis current reaches a corresponding command value, the control circuit switches the inverter control mode from the rectangular wave control to the PWM control.

Patent Document 1: Japanese Patent Laying-Open No. 2007-306699

DISCLOSURE OF THE INVENTION

Problems to be Solved by the Invention

According to Japanese Patent Laying-Open No. 2007-306699 (Patent Document 1), whether or not switching from the PWM control to the rectangular wave control is necessary is determined based solely on the modulation factor, while whether or not switching from the rectangular wave control to the PWM control is necessary is determined based on the modulation factor and the q-axis current. Therefore, processes for determining the necessity of switching between control modes possibly become complicated.

An object of the present invention is to provide a controller for an AC electric motor that can avoid complication of determination as to whether the inverter control is to be switched or not, as well as to provide an electric powered vehicle having the controller and the AC electric motor mounted thereon.

Means for Solving the Problems

In short, the present invention provides a controller for an AC electric motor. An applied voltage applied to the AC electric motor is controlled by an inverter converting a DC voltage to the applied voltage. The controller includes a current detector, a pulse width modulation control unit, a rectangular wave voltage control unit, a voltage deviation calculating unit, a modulation factor calculating unit, and a mode switching determination unit. The current detector detects a motor current flowing between the inverter and the AC electric motor. The pulse width modulation control unit generates, based on a current deviation between the motor current detected by the current detector and a current command corresponding to an operation command of the AC electric motor, an AC voltage command causing the AC electric motor to operate in accordance with the operation command. The pulse width modulation control unit generates, by pulse width modulation control based on a comparison between the AC voltage command and a carrier wave, a control command for the inverter. The rectangular wave voltage control unit generates the control command for the inverter, by the rectangular wave voltage control controlling the applied voltage such that the applied voltage comes to be a rectangular wave voltage having a phase in accordance with the operation command, based on the motor current detected by the current detector and the operation command of the AC electric motor. The voltage deviation calculating unit calculates, by executing an operation of substituting the current deviation to a voltage equation of the AC electric motor, a voltage deviation between a first voltage command corresponding to the AC voltage command when the rectangular wave voltage control is executed and a second voltage command corresponding to the AC voltage command when the pulse width modulation control is executed. The modulation factor calculating unit calculates a first control value representing a modulation factor defined as a ratio of an effective value of the applied voltage with respect to the DC voltage, based on the first voltage command and the voltage deviation. The mode switching determination unit determines, when the rectangular wave voltage control is being executed by the rectangular wave voltage control unit, based on the first control value, whether or not switching of control mode of the AC electric motor from the rectangular wave voltage control to the pulse width modulation control is necessary.

Preferably, the current deviation includes a d-axis current deviation and a q-axis current deviation. The voltage deviation calculating unit calculates the voltage deviation including a d-axis voltage deviation and a q-axis voltage deviation, by executing an operation of substituting the d-axis current deviation and the q-axis current deviation to the voltage equation. The modulation factor calculating unit calculates, by subtracting a correction value representing a magnitude of a composite vector of the d-axis voltage deviation and the q-axis voltage deviation from a first value representing a magnitude of a voltage vector corresponding to the first voltage command, a second value representing a magnitude of a voltage vector corresponding to the second voltage command. The modulation factor calculating unit calculates the first control value, based on a ratio of the second value with respect to the first value and on the value of the modulation factor when the rectangular wave voltage control is executed.

Preferably, the modulation factor calculating unit calculates, based on the second voltage command and the DC voltage value, a second control value representing the modulation factor when the pulse width modulation control is being executed by the pulse width modulation control unit. The mode switching determination unit determines, based on the second control value, whether or not switching of control mode from the pulse width modulation control to the rectangular wave voltage control is necessary.

Preferably, the mode switching determination unit determines that switching from the rectangular wave voltage control to the pulse width modulation control is necessary when the first control value is smaller than a first reference value. The mode switching determination unit determines that switching from the pulse width modulation control to the rectangular wave voltage control is necessary when the second control value is larger than a second reference value. The first reference value is smaller than the second reference value.

Preferably, the pulse width modulation control unit generates the second voltage command such that the current deviation becomes closer to 0.

Preferably, the pulse width modulation control unit includes a first control unit and a second control unit. The first control unit generates the control command in accordance with the current deviation, by sine wave pulse width modulation method. The second control unit generates the control command in accordance with the current deviation, by over modulation pulse width modulation method for outputting the applied voltage having larger fundamental wave component than the sine wave pulse width modulation method.

According to another aspect, the present invention provides an electric vehicle including an AC electric motor, an inverter, and a controller. The inverter converts a DC voltage to an applied voltage applied to the AC electric motor and controls the applied voltage. The controller controls the inverter. The controller includes a current detector, a pulse width modulation control unit, a rectangular wave voltage control unit, a voltage deviation calculating unit, a modulation factor calculating unit, and a mode switching determination unit. The current detector detects a motor current flowing between the inverter and the AC electric motor. The pulse width modulation control unit generates, based on a current deviation between the motor current detected by the current detector and a current command corresponding to an operation command of the AC electric motor, an AC voltage command causing the AC electric motor to operate in accordance with the operation command. The pulse width modulation control unit generates, by pulse width modulation control based on a comparison between the AC voltage command and a carrier wave, a control command for the inverter. The rectangular wave voltage control unit generates the control command for the inverter, by the rectangular wave voltage control controlling the applied voltage such that the applied voltage comes to be a rectangular wave voltage having a phase in accordance with the operation command, based on the motor current detected by the current detector and the operation command of the AC electric motor. The voltage deviation calculating unit calculates, by executing an operation of substituting the current deviation to a voltage equation of the AC electric motor, a voltage deviation between a first voltage command corresponding to the AC voltage command when the rectangular wave voltage control is executed and a second voltage command corresponding to the AC voltage command when the pulse width modulation control is executed. The modulation factor calculating unit calculates a first control value representing a modulation factor defined as a ratio of an effective value of the applied voltage with respect to the DC voltage, based on the first voltage command and the voltage deviation. The mode switching determination unit determines, when the rectangular wave voltage control is being executed by the rectangular wave voltage control unit, based on the first control value, whether or not switching of control mode of the AC electric motor from the rectangular wave voltage control to the pulse width modulation control is necessary.

Preferably, the current deviation includes a d-axis current deviation and a q-axis current deviation. The voltage deviation calculating unit calculates the voltage deviation including a d-axis voltage deviation and a q-axis voltage deviation, by executing an operation of substituting the d-axis current deviation and the q-axis current deviation to the voltage equation. The modulation factor calculating unit calculates, by subtracting a correction value representing a magnitude of a composite vector of the d-axis voltage deviation and the q-axis voltage deviation from a first value representing a magnitude of a voltage vector corresponding to the first voltage command, a second value representing a magnitude of a voltage vector corresponding to the second voltage command. The modulation factor calculating unit calculates the first control value, based on a ratio of the second value with respect to the first value and on the value of the modulation factor when the rectangular wave voltage control is executed.

Preferably, the modulation factor calculating unit calculates, based on the second voltage command and the DC voltage value, a second control value representing the modulation factor when the pulse width modulation control is being executed by the pulse width modulation control unit. The mode switching determination unit determines, based on the second control value, whether or not switching of control mode from the pulse width modulation control to the rectangular wave voltage control is necessary.

Preferably, the mode switching determination unit determines that switching from the rectangular wave voltage control to the pulse width modulation control is necessary when the first control value is smaller than a first reference value. The mode switching determination unit determines that switching from the pulse width modulation control to the rectangular wave voltage control is necessary when the second control value is larger than a second reference value. The first reference value is smaller than the second reference value.

Preferably, the pulse width modulation control unit generates the second voltage command such that the current deviation becomes closer to 0.

Preferably, the pulse width modulation control unit includes a first control unit and a second control unit. The first control unit generates the control command in accordance with the current deviation, by sine wave pulse width modulation method. The second control unit generates the control command in accordance with the current deviation, by over modulation pulse width modulation method for outputting the applied voltage having larger fundamental wave component than the sine wave pulse width modulation method.

Effects of the Invention

According to the present invention, it is possible to avoid complication of the determination as to whether switching of inverter control is necessary.

BRIEF DESCRIPTION OF THE DRAWINGS

FIG. 2 schematically illustrates control modes of an AC electric motor M1 provided in a motor drive control system 100 in accordance with the embodiment of the present invention.

FIG. 3 shows correspondence between states of operation of AC electric motor M1 and various control modes.

Figure 1:
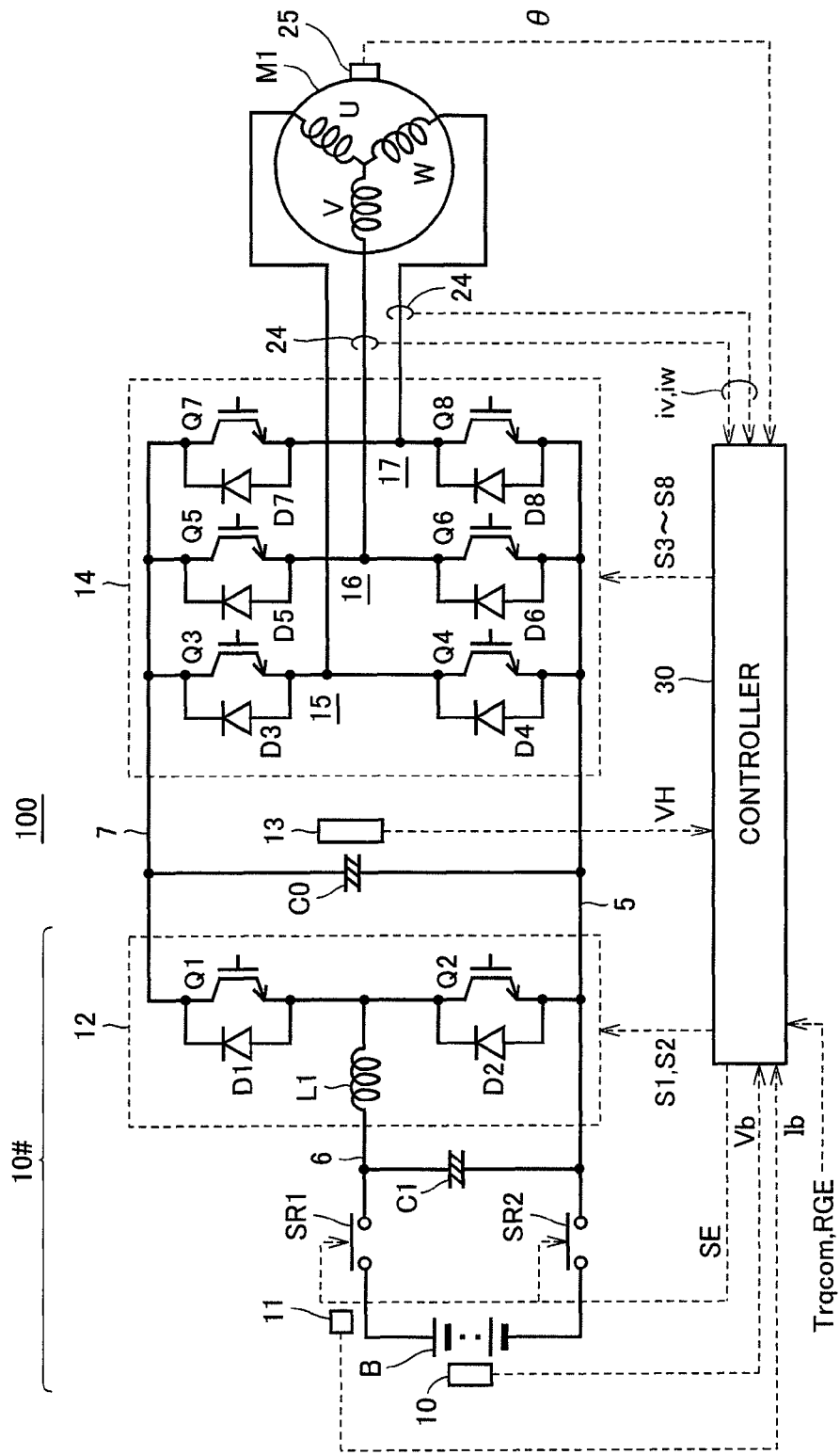
FIG. 1 shows an overall configuration of a motor drive control system to which the controller for AC electric motor in accordance with an embodiment of the present invention is applied.

DESCRIPTION OF THE REFERENCE SIGNS 5 ground line, 6, 7 power lines, 10# DC voltage generating unit, 10, 13 voltage sensors, 11, 24 current sensors, 12 converter, 14 inverter, 15 U-phase arm, 16 V-phase arm, 17 W-phase arm, 25 rotation angle sensor, 30 controller, 100 motor drive control system, 110 first MG, 120 second MG, 130 power split device, 140 reduction gear, 150 engine, 160 driving wheel, 170 inverter unit, 200 sine wave PWM control unit, 201 over modulation PWM control unit, 210 current command generating unit, 220, 250 coordinate converting units, 230 current filter, 240 voltage command generating unit, 260 PWM modulating unit, 262 carrier wave, 264 AC voltage command, 270 voltage amplitude correcting unit, 280 PWM control unit, 320 voltage deviation calculating unit, 340 modulation factor calculating unit, 360 mode switching determining unit, 380 mode selecting unit, 400 rectangular wave voltage control unit, 410 power calculating unit, 420 torque calculating unit, 430 PI calculating unit, 440 rectangular wave generator, 450 signal generating unit, 1000 hybrid vehicle, A1 low rotation range, A2 middle rotation range, A3 high rotation range, B DC power source, B1, B2 curves, C0, C1 smoothing capacitors, D1-D8 anti-parallel diodes, L1 reactor, M1 AC electric motor, P1, P2 points, Q1-Q8 power semiconductor switching elements, S1-S8 switching control signals, SR1, SR2 system relays, V1, V2 voltage command vectors.

BEST MODES FOR CARRYING OUT THE INVENTION

In the following, embodiments of the present invention will be described in detail with reference to the figures. In the figures, the same or corresponding portions are denoted by the same reference characters and description thereof will not be repeated.

(Overall Configuration of Electric Motor Control)

FIG. 1 shows an overall configuration of a motor drive control system to which the controller for AC electric motor in accordance with an embodiment of the present invention is applied.

Referring to FIG. 1, a motor drive control system 100 includes a DC voltage generating unit 10#, a smoothing capacitor C0, an inverter 14, an AC electric motor M1, a current sensor 24, and a controller 30. The controller for AC electric motor in accordance with the present embodiment includes at least current sensor 24 and controller 30.

AC electric motor M1 is, for example, a driving motor for generating torque for driving a driving wheel of an electric powered vehicle. Here, the "electric powered vehicle" refers to an automobile that generates the vehicle driving power by electric energy, such as a hybrid vehicle, an electric vehicle or a fuel cell vehicle.

AC electric motor M1 may be configured to have a function of a generator driven by an engine. Alternatively, AC electric motor M1 may be configured to have both the functions of an electric motor and a generator. Further, AC electric motor M1 may be mounted on a hybrid vehicle to serve as a motor for the engine (for example, for activating the engine). Specifically, in the present embodiment, the "AC electric motor" includes AC-driven motor, generator and motor-generator.

DC voltage generating unit 10# includes a DC power source B, system relays SR1 and SR2, a smoothing capacitor C1 and a converter 12.

DC power source B is typically implemented by a power storage device such as a nickel hydride or lithium ion secondary battery or an electric double-layer capacitor. A DC voltage Vb output by DC power source B and a DC current Ib input to/output from DC power source B are detected by voltage sensor 10 and current sensor 11, respectively.

System relay SR1 is connected between a positive electrode terminal of DC power source B and a power line 6. System relay SR2 is connected between a negative electrode terminal of DC power source B and ground line 5. System relays SR1 and SR2 are turned on/off in response to a signal SE from controller 30.

Converter 12 includes a reactor L1, power semiconductor switching elements Q1 and Q2, and anti-parallel diodes D1 and D2. Power semiconductor switching elements Q1 and Q2 are connected in series between a power line 7 and ground line 5. Power semiconductor switching element Q1 has its on/off controlled by a switching control signal S1 from controller 30. Power semiconductor switching element Q2 has its on/off controlled by a switching control signal S2 from controller 30.

In the embodiment of the present invention, as the power semiconductor switching element (hereinafter simply referred to as a "switching element"), by way of example, an IGBT (Insulated Gate Bipolar Transistor), a power MOS (Metal Oxide Semiconductor) transistor, or a power bipolar transistor may be used. Corresponding to switching elements Q1 and Q2, anti-parallel diodes D1 and D2 are arranged. Reactor L1 is connected between a connection node of switching elements Q1 and Q2 and power line 6. Further, smoothing capacitor C0 is connected between power line 7 and ground line 5.

Inverter 14 includes a U-phase arm 15, a V-phase arm 16 and a W-phase arm 17 provided in parallel between power line 7 and ground line 5. Each arm is formed of two switching elements connected in series between power line 7 and ground line 5. For example, U-phase arm 15 includes switching elements Q3 and Q4, V-phase arm 16 includes switching elements Q5 and Q6, and W-phase arm 17 includes switching elements Q7 and Q8. Further, anti-parallel diodes D3 to D8 are respectively connected to switching elements Q3 to Q8. Switching elements Q3 to Q8 have their on/off controlled by switching control signals S3 to S8 from controller 30.

Typically, AC electric motor M1 is a 3-phase, permanent magnet motor with U, V and W phase coils each having one end commonly connected to a neutral point. Each of the three phase coils has the other end connected to a connection node between the two switching elements included in the corresponding arm.

Converter 12 is capable of voltage boosting and lowering operations. In the voltage boosting operation, converter 12 boosts DC voltage Vb supplied from AC power source B, and supplies resulting DC voltage VH to inverter 14. Specifically, in response to switching control signals S1 and S2 from controller 30, on-period of switching element Q1 and on-period of switching element Q2 (or period in which both switching element Q1 and Q2 are off) are provided alternately. The boosting ratio corresponds to the ratio between the on-periods. If switching elements Q1 and Q2 are fixed to on and off, respectively, it is possible to make VH equal to Vb (to set the boosting ratio to 1.0). In the following, the DC voltage VH as the input voltage to inverter 14 is also referred to as "system voltage."

In the voltage lowering operation, converter 12 lowers the DC voltage VH (system voltage) supplied from inverter 14 through smoothing capacitor C0 and charges DC power source B. Specifically, in response to switching control signals 51 and S2 from controller 30, a period in which switching element Q1 only is on and a period in which switching elements Q1 and Q2 are both off (or on-period of switching element Q2) are provided alternately. The voltage lowering ratio corresponds to the duty ratio of the on-period.

Smoothing capacitor C0 smoothes the DC voltage from converter 12, and supplies the smoothed DC voltage to inverter 14. Voltage sensor 13 detects the voltage across opposite ends of smoothing capacitor C0, that is, the system voltage VH, and outputs the detected value to controller 30.

If a torque command value of AC electric motor M1 is positive (Trqcom>0), inverter 14 converts the DC voltage VH supplied from smoothing capacitor C0 to an AC voltage. By applying the AC voltage to AC electric motor M1, inverter 14 drives AC electric motor M1 such that a positive torque is output.

If the torque command value of AC electric motor M1 is 0 (Trqcom=0), inverter 14 converts the DC voltage VH supplied from smoothing capacitor C0 to an AC voltage. By applying the AC voltage to AC electric motor M1, inverter 14 drives AC electric motor M1 such that the torque attains to 0.

Switching elements Q3 to Q8 execute switching operations in response to switching control signals S3 to S8 from controller 30. Consequently, an AC voltage causing AC electric motor M1 to output the positive (or 0) torque designated by the torque command value Trqcom is applied to the AC electric motor.

Further, at the time of regenerative braking of an electric powered vehicle having motor drive control system 100 mounted thereon, the torque command value Trqcom of AC electric motor M1 is set to a negative value (Trqcom<0). In this case, inverter 14 converts the AC voltage generated by AC electric motor M1 to a DC voltage, by the switching operations in response to switching control signals S3 to S8. Inverter 14 supplies the converted DC voltage (system voltage) to converter 12 through smoothing capacitor C0. Here, the regenerative braking includes braking with power regeneration that takes place when the driver driving the electric powered vehicle operates the foot brake. Further, regenerative braking includes deceleration (or stopping acceleration) of the vehicle while regenerating power, by releasing the accelerator pedal during running, without operating the foot brake.

Current sensor 24 detects a motor current flowing between inverter 14 and AC electric motor M1, and outputs the detected motor current to controller 30. The sum of instantaneous values of three-phase currents iu, iv and iw is 0. Therefore, it is sufficient to arrange current sensor 24 to detect motor currents of two phases (for example, v-phase current iv and W-phase current iw), as shown in FIG. 1.

A rotation angle sensor 25 detects a rotor rotation angle $\theta$ of AC electric motor M1, and transmits the detected rotation angle $\theta$ to controller 30. Rotation angle sensor 25 is implemented, for example, by a resolver. Based on the detected rotation angle $\theta$, controller 30 can calculate the number of rotations (speed of rotation) and angular velocity $\omega$(rad/s) of AC electric motor M1. Provision of rotation angle sensor 25 may be omitted, if controller 30 is adapted to directly calculate rotation angle $\theta$ from motor voltage or motor current.

Controller 30 is implemented by an electronic control unit (ECU), and controls operations of motor drive control system 100 by software processing realized through execution of programs stored in advance by a CPU (Central Processing Unit), not shown, and/or by hardware processing realized by dedicated electronic circuitry.

As a representative function, controller 30 controls converter 12 and inverter 14 such that AC electric motor M1 outputs the torque in accordance with the torque command value Trqcom in accordance with the control method described later. Specifically, controller 30 generates switching control signals 51 to S8 for controlling converter 12 and inverter 14 in the manner as described above, and outputs these signals to converter 12 and inverter 14. In order to generate switching control signals S1 to S8, controller 30 receives, for example, torque command value Trqcom, DC voltage Vb detected by voltage sensor 10, DC current Ib detected by current sensor 11, system voltage VH detected by voltage sensor 13, motor currents iv and iw detected by current sensor 24, and rotation angle $\theta$ detected by rotation angle sensor 25.

At the time of voltage boosting operation of converter 12, controller 30 generates switching control signals S1 and S2 such that system voltage VH becomes equal to the voltage command value. Here, controller 30 executes feedback control based on the value detected by voltage sensor 13.

When a signal RGE representing that the electric powered vehicle entered the regenerative braking mode is received from an external ECU (not shown), controller 30 generates switching control signals S3 to S8 and outputs these signals to inverter 14 such that the AC voltage generated by AC electric motor M1 is converted to the DC voltage. Consequently, inverter 14 converts the AC voltage generated by AC electric motor M1 to a DC voltage and supplies it to converter 12. Further, controller 30 generates switching control signals S1 and S2 so as to lower the DC voltage supplied from inverter 14, and outputs these signals to converter 12. In response to switching signals S1 and S2, converter 12 lowers the DC voltage from inverter 14. In this manner, the electric power generated by AC electric motor M1 is supplied to DC power source B.

(Description of Control Mode)

FIG. 2 schematically illustrates control modes of AC electric motor M1 provided in motor drive control system 100 in accordance with the embodiment of the present invention.

Referring to FIG. 2, motor drive control system 100 has three control modes (methods) for controlling AC electric motor M1 (power conversion by inverter 14). The three control modes are the sine wave PWM control, the over modulation PWM control and the rectangular wave voltage control.

The sine wave PWM control is used as general PWM control, in which an upper arm element and a lower arm element included in each phase are on/off controlled in accordance with voltage comparison between a sinusoidal voltage command and a carrier wave (typically, a triangular wave). As a result, for a set of high-level period corresponding to the on period of the upper arm element and low-level period corresponding to the on period of the lower arm element, duty is controlled such that the fundamental wave component becomes a sinusoidal wave in a prescribed period. As is well known, in the sine wave PWM control, amplitude of the sinusoidal voltage command is limited to be within the range of carrier wave amplitude. Therefore, the fundamental wave component of the voltage applied to AC electric motor M1 (in the following, also simply referred to as "motor-applied voltage") can be increased at most to about 0.61 times the DC link voltage of the inverter.

In the present specification, the ratio of fundamental wave component (effective value) of motor-applied voltage (line voltage) with respect to the DC link voltage of inverter 14 (that is, system voltage VH) will be referred to as the "modulation factor."

In the sine wave PWM control, the amplitude of sine wave voltage command is within the range of carrier wave amplitude. Therefore, the line voltage applied to AC electric motor M1 comes to be a sine wave. A control method in which a harmonic component of 3n order (n: natural number, typically 3rd harmonic wave of n=1) is superposed on the sinusoidal component in the range not exceeding the carrier wave amplitude to generate a voltage command has also been proposed. According to this control method, because of the harmonic component, a period occurs in which the voltage command becomes higher than the carrier wave amplitude. The 3n order harmonic component superposed on each phase is cancelled on the line. Therefore, the waveform of sine wave of the line voltage can be maintained. In the present embodiment, this control method is also included in the sine wave PWM control.

In the rectangular wave voltage control, a voltage corresponding to one pulse of a rectangular wave is applied to the AC electric motor. In the rectangular wave, the ratio between the high-level period and the low-level period in the aforementioned prescribed period becomes 1:1. Therefore, the modulation factor can be increased to 0.78.

The over modulation PWM control realizes PWM control similar to the sine wave PWM control described above, with the amplitude of voltage command (sinusoidal component) being in a range larger than the carrier wave amplitude. Particularly, the fundamental wave component can be made higher by distorting the voltage command from the original sinusoidal waveform (by amplitude correction) and, therefore, the modulation factor can be increased from the highest modulation factor in the sine wave PWM control mode (about 0.61 as mentioned above) to the range of 0.78. In the over modulation PWM control, the amplitude of voltage command (sinusoidal component) is larger than the carrier wave amplitude and, therefore, the line voltage applied to AC electric motor M1 comes to be a distorted sine wave voltage.

In AC electric motor M1, inductive voltage becomes higher when the number of rotations or output torque increases. Therefore, the necessary driving voltage (motor-required voltage) becomes higher. As a result, the voltage boosted by converter 12, that is, the system voltage VH, must be set higher than the motor-required voltage. On the other hand, there is a limit value (VH maximum voltage) of the voltage boosted by converter 12, that is, the system voltage VH.

Therefore, in accordance with the state of operation of AC electric motor M1, any of the sine wave PWM control, the over modulation PWM control and the rectangular wave voltage control mode is selectively applied. In the following, the sine wave PWM control and the over modulation PWM control may be generally referred to as "PWM control mode."

In the sine wave PWM control or the over modulation PWM control, the amplitude and phase of motor-applied voltage (AC) are controlled by motor current feedback. This realizes torque control. In contrast, in the rectangular wave voltage control, the amplitude of motor-applied voltage is fixed. Therefore, in the rectangular wave voltage control, based on the deviation between the actual torque value and the torque command value, the phase of rectangular wave voltage pulse is controlled and thereby torque control is realized.

FIG. 3 shows correspondence between the states of operation of AC electric motor M1 and the control modes described above.

Referring to FIG. 3, briefly stated, in a low rotation number range A1, the sine wave PWM control is applied to reduce torque fluctuation, in a middle rotation number range A2, the over modulation PWM control is applied, and in a high rotation number range A3, the rectangular wave voltage control is applied. Particularly, by applying the over modulation PWM control and the rectangular wave voltage control, the output of AC electric motor M1 can be improved.

(Controller Configuration)

Figure 4:
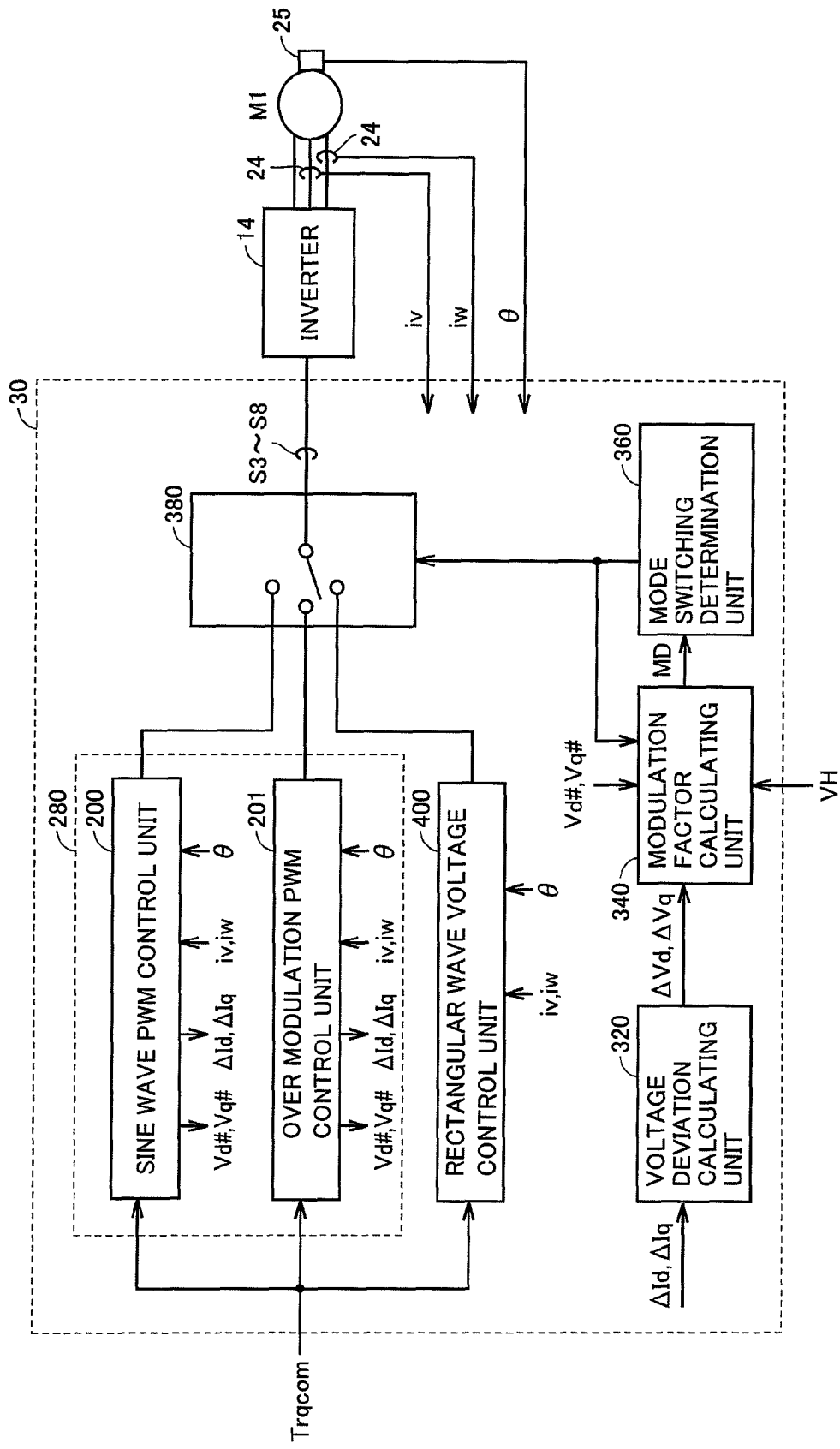
FIG. 4 is a functional block diagram showing a control structure of a controller 30 shown in FIG. 1.

FIG. 4 is a functional block diagram showing a control structure of controller 30 shown in FIG. 1. Each of the functional blocks for motor control depicted in the block diagrams as will be described in the following, including FIG. 4, is realized by hardware or software processing by controller 30.

Referring to FIG. 4, controller 30 includes a PWM control unit 280, a rectangular wave voltage control unit 400, a voltage deviation calculating unit 320, a modulation factor calculating unit 340, a mode switching determination unit 360, and a mode selecting unit 380. PWM control unit 280 includes a sine wave PWM control unit 200 and an over modulation PWM control unit 201.

Sine wave PWM control unit 200 receives torque command value Trqcom, motor currents iv and iw detected by current sensor 24, and rotation angle θ detected by rotation angle sensor 25, and generates switching control signals S3 to S8 of inverter 14 so that AC electric motor M1 outputs torque in accordance with the torque command value Trqcom. Specifically, sine wave PWM control unit 200 calculates, based on the torque command value Trqcom, motor currents iv and iw and rotation angle θ, current deviations ΔId and ΔIq between the current command value corresponding to the torque command value Trqcom and the detected motor currents. Based on the current deviations ΔId and ΔIq, sine wave PWM control unit 200 calculates voltage command values Vd# and Vq# as command values for the motor-applied voltage. Based on the voltage command values Vd# and Vq#, sine wave PWM control unit 200 generates switching control signals S3 to S8. Sine wave PWM control unit 200 outputs the current deviations ΔId and ΔIq to voltage deviation calculating unit 320 and outputs the voltage command values Vd# and Vq# to modulation factor calculating unit 340.

Over modulation PWM control unit 201 receives torque command value Trqcom, motor currents iv and iw detected by current sensor 24, and rotation angle θ detected by rotation angle sensor 25, and generates switching control signals S3 to S8 for driving inverter 14. Over modulation PWM control unit 201 executes calculations similar to those executed by sine wave PWM control unit 200 to calculate the current deviations ΔId and ΔIq and the voltage command values Vd# and Vq#, and generates switching control signals S3 to S8. Over modulation PWM control unit 201 outputs the current deviations ΔId and ΔIq to voltage deviation calculating unit 320 and outputs the voltage command values Vd# and Vq# to modulation factor calculating unit 340.

Rectangular wave voltage control unit 400 receives torque command value Trqcom, motor currents iv and iw detected by current sensor 24, and rotation angle detected by rotation angle sensor 25. Based on the detected motor current of each phase and the applied voltage to each phase of AC electric motor M1, rectangular wave voltage control unit 400 calculates an estimated torque value. Rectangular wave voltage control unit 400 sets voltage phase to be applied to inverter 14 from the deviation between the estimated torque value and the torque command value Trqcom, and generates switching control signals S3 to S8 based on the voltage phase.

Voltage deviation calculating unit 320 calculates voltage deviations ΔVd and ΔVq based on the current deviations ΔId and ΔIq received from PWM control unit 280 (sine wave PWM control unit 200 or over modulation PWM control unit 201). Voltage deviations ΔVd and ΔVq represent deviations of voltage command when the rectangular wave voltage control is executed, with respect to the voltage command (voltage command when the PWM control is executed) corresponding to a certain torque command value Trqcom.

When the PWM control is executed, modulation factor calculating unit 340 calculates the modulation factor MD based on the voltage command values Vd# and Vq# calculated by PWM control unit 200 and the DC voltage VH detected by voltage sensor 13. When the rectangular wave voltage control is executed, modulation factor calculating unit 340 calculates the modulation factor MD based on the voltage deviations ΔVd and ΔVq calculated by voltage deviation calculating unit 320.

Mode switching determination unit 360 determines, based on the modulation factor MD calculated by modulation factor calculating unit 340, whether or not switching of the control mode from the rectangular wave voltage control to the PWM control is necessary, and whether or not switching from the PWM control to the rectangular wave voltage control is necessary. Further, mode switching determination unit 360 determines, based on the modulation factor MD calculated by modulation factor calculating unit 340, whether or not switching from the sine wave PWM control to the over modulation PWM control is necessary, and whether or not switching from the over modulation PWM control to the sine wave PWM control is necessary.

Based on the result of determination by mode switching determination unit 360, mode selecting unit 380 switches the control mode of AC electric motor M1 between the PWM control mode and the rectangular wave voltage control mode. Further, when the control mode of AC electric motor M1 is the PWM control mode, mode selecting unit 380 switches the control mode between the sine wave PWM control and the over modulation PWM control, based on the result of determination by mode switching determination unit 360.

Figure 5:
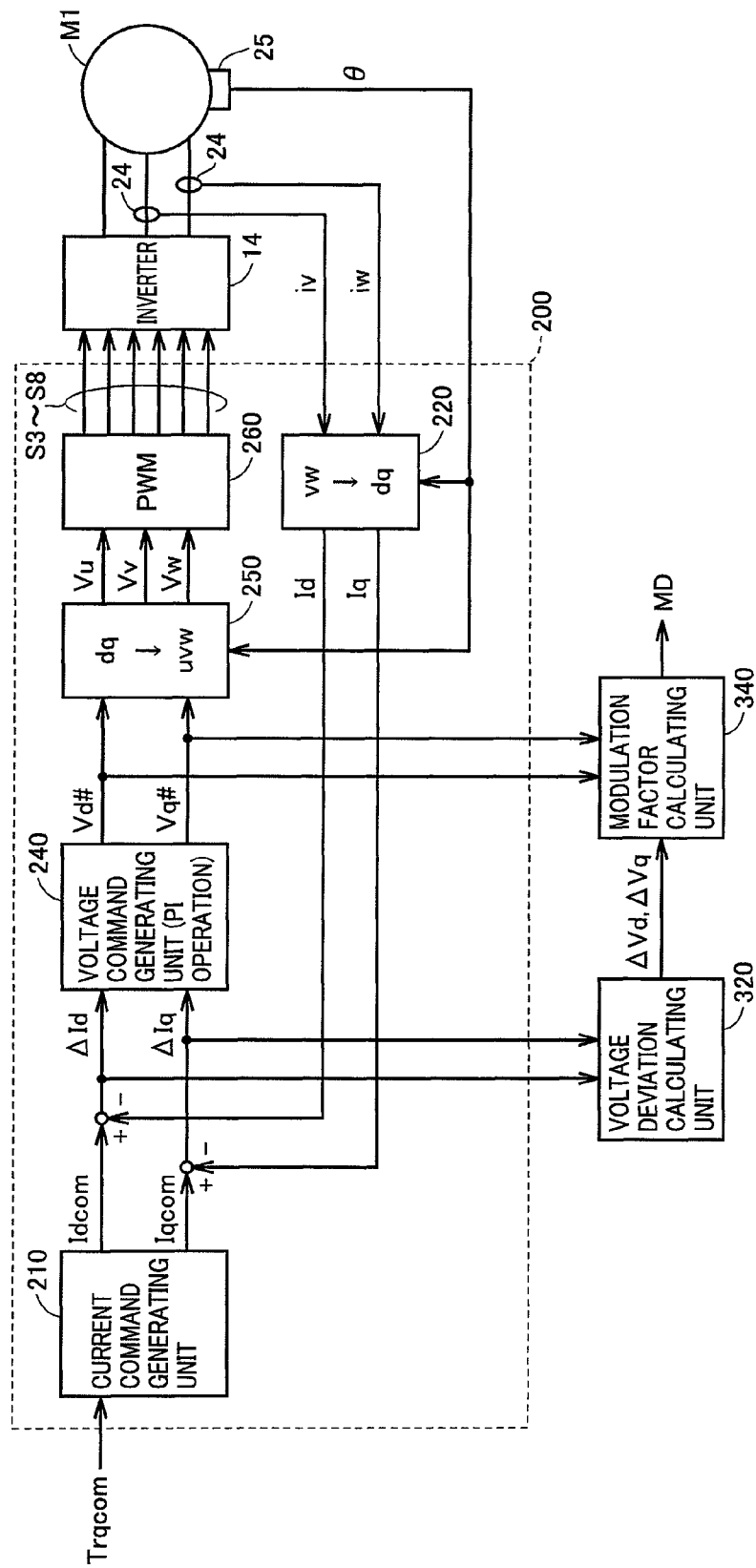
FIG. 5 is a functional block diagram showing a configuration of a sine wave PWM control unit 200 of FIG. 4.

Next, each of the functional blocks shown in FIG. 4 will be described in greater detail. FIG. 5 is a functional block diagram showing a configuration of sine wave PWM control unit 200 of FIG. 4.

Referring to FIG. 5, sine wave PWM control unit 200 includes a current command generating unit 210, coordinate converting units 220 and 250, a voltage command generating unit 240, and a PWM modulating unit 260.

Current command generating unit 210 generates a d-axis current command value Idcom and a q-axis current command value Iqcom in accordance with the torque command value Trqcom of AC electric motor M1, in accordance with a table or the like prepared in advance.

Coordinate converting unit 220 calculates, by coordinate conversion (from three-phase to two-phase) using the rotation angle θ of AC electric motor M1 detected by rotation angle sensor 25, the d-axis current Id and the q-axis current Iq, based on the v-phase current iv and w-phase current iw detected by current sensor 24.

To voltage command generating unit 240, the deviation ΔId (ΔId=Idcom−Id) between the d-axis current command value and the d-axis current Id, and the deviation ΔIq (ΔIq=Iqcom−Iq) between the q-axis current command value and the q-axis current Iq are input. Voltage command generating unit 240 performs a PI (proportional integral) operation with a prescribed gain on each of d-axis current deviation ΔId and q-axis current deviation ΔIq, to calculate control deviation. Voltage command generating unit 240 generates the d-axis voltage command value Vd# and the q-axis voltage command value Vq# in accordance with the control deviation.

Coordinate converting unit 250 converts the d-axis voltage command value Vd# and the q-axis voltage command value Vq# to a U-phase voltage command Vu, a V-phase voltage command Vv and a W-phase voltage command Vw, by coordinate conversion (from two-phase to three-phase) using the rotation angle of AC electric motor M1.

Figure 6:
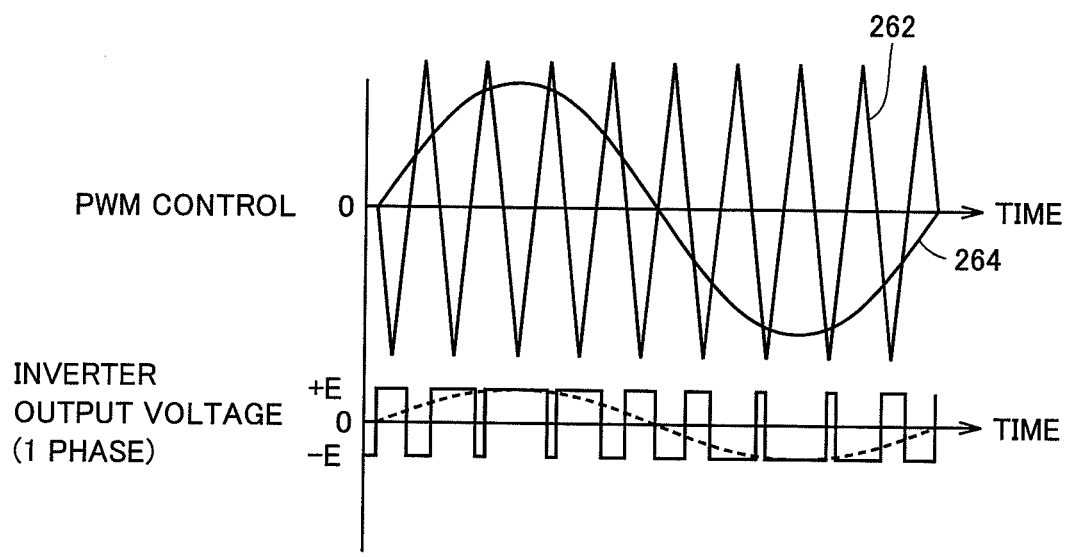
FIG. 6 is a diagram of waveforms representing an operation of a PWM modulating unit 260 shown in FIG. 4.

As shown in FIG. 6, PWM modulating unit 260 controls on/off of upper and lower arms of each phase of inverter 14 based on the comparison between a carrier wave 262 and an AC voltage command 264 (generally representing Vu, Vv and Vw), and thereby generates quasi sinusoidal voltage at each phase of AC electric motor M1. Carrier wave 262 is a triangular wave or saw-tooth wave of a prescribed frequency. As described above, it is possible to superpose 3n order harmonics on the sinusoidal AC voltage command.

In pulse width modulation for inverter control, the amplitude of carrier wave 262 corresponds to the input DC voltage (system voltage VH) of inverter 14. It is noted, however, that if the amplitude of pulse-width modulated AC voltage command is converted to the amplitudes of original voltage commands Vu, Vv and Vw divided by system voltage VH, the amplitude of carrier wave 262 used in PWM modulating unit 260 can be fixed.

Again referring to FIG. 5, switching of inverter 14 is controlled in accordance with switching control signals S3 to S8 generated by PWM control unit 200, whereby an AC voltage for outputting torque in accordance with the torque command value Trqcom is applied to AC electric motor M1.

The d-axis current deviation ΔId and q-axis current deviation ΔIq are transmitted to voltage deviation calculating unit 320. Further, the d-axis voltage command value Vd# and the q-axis voltage command value Vq# generated by voltage command generating unit 240 are transmitted to modulation factor calculating unit 340.

Figure 7:
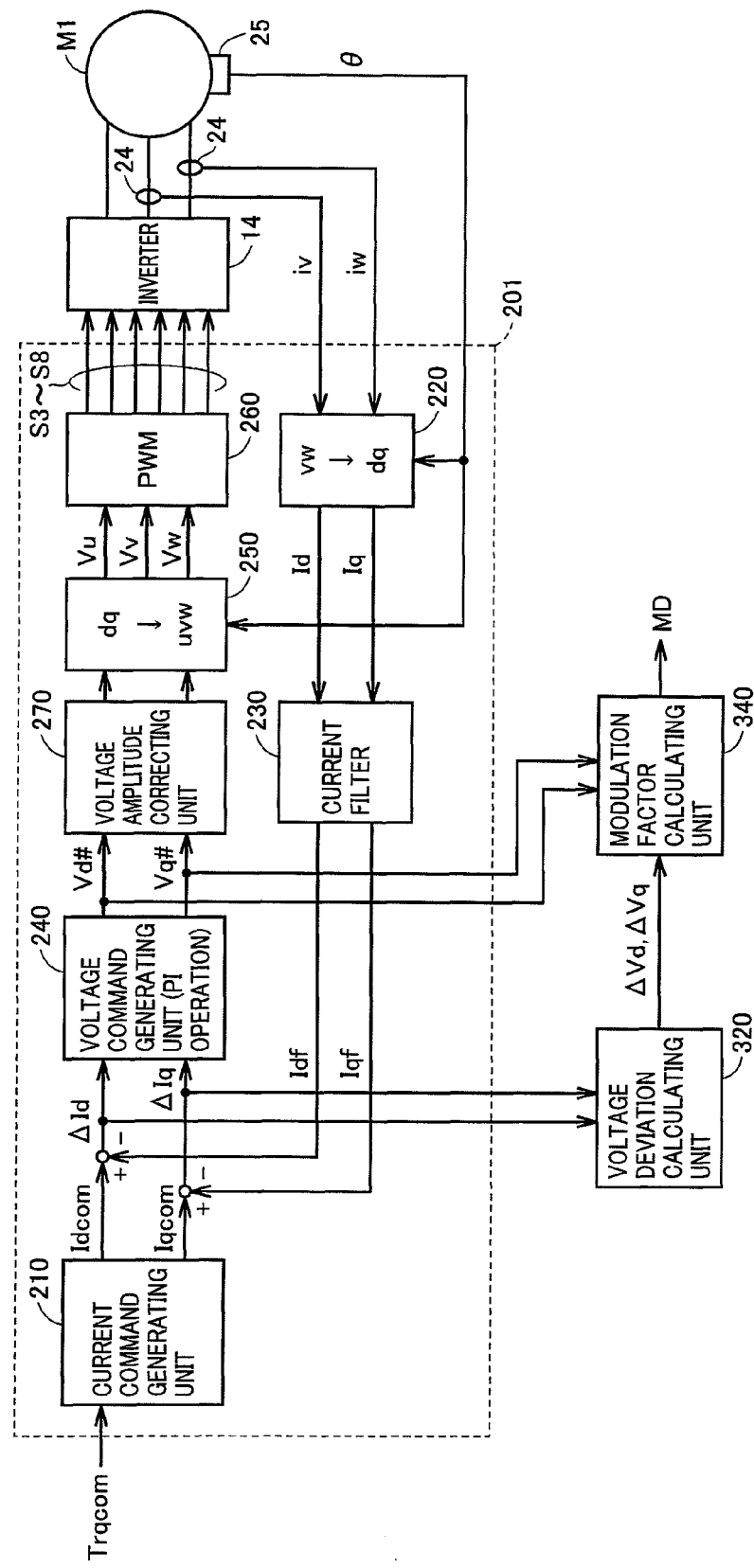
FIG. 7 is a functional block diagram showing a configuration of an over modulation PWM control unit 201.

FIG. 7 is a functional block diagram showing a configuration of over modulation PWM control unit 201.

Referring to FIGS. 7 and 5, over modulation PWM control unit 201 includes, in addition to the configuration of sine wave PWM control unit 200, a current filter 230 and a voltage amplitude correcting unit 270.

Current filter 230 executes a process for smoothing the d-axis current Id and q-axis current Iq calculated by coordinate converting unit 220 in the direction of time axis. Thus, the actual currents Id and Iq based on the sensor detected values are converted to filtered currents Idf and Iqf.

In over modulation PWM control unit 201, current deviations ΔId and ΔIq are calculated using the filtered currents Idf and Iqf. Specifically, current deviations ΔId and ΔIq are calculated in accordance with the equations ΔId=Idcom−Idf and ΔIq=Iqcom−Iqf.

Voltage amplitude correcting unit 270 executes a correction process for enlarging the amplitude of motor-applied voltage, on the original d-axis voltage command value Vd# and the q-axis voltage command value Vq# calculated by voltage command generating unit 240. Coordinate converting unit 250 and modulating unit 260 generate switching control signals S3 to S8 for inverter 14, in accordance with the voltage command corrected by voltage amplitude correcting unit 270.

The d-axis current deviation ΔId and q-axis current deviation ΔIq are transmitted to voltage deviation calculating unit 320. Further, d-axis voltage command value Vd# and the q-axis voltage command value Vq# calculated by voltage command generating unit 240 are transmitted to modulation factor calculating unit 340.

When the over modulation PWM control is applied, the amplitude of voltage command of each phase obtained by two-phase to three-phase conversion of voltage command values Vd# and Vq# is larger than the inverter input voltage (system voltage VH). This state corresponds to the state in which the amplitude of AC voltage command 264 becomes larger than the amplitude of carrier wave 262 in FIG. 6 (diagram of waveforms). Here, inverter 14 cannot apply a voltage exceeding the system voltage VH to AC electric motor M1. Therefore, in the PWM control using voltage command signals of respective phases based on the original voltage command values Vd# and Vq#, it becomes impossible to ensure the modulation factor (original modulation factor) for the voltage command values Vd# and Vq#.

Therefore, when the over modulation PWM control is applied, correction process is conducted to enlarge the voltage amplitude and thereby to increase the voltage application period, on the AC voltage command derived from voltage command values Vd# and Vq#. Thus, it becomes possible to ensure the original modulation factor for the voltage command values Vd# and Vq#. The ratio of enlargement (larger than 1) of the voltage amplitude by voltage amplitude correcting unit 270 can be theoretically derived based on the original modulation factor.

In this manner, sine wave PWM control unit 200 executes the feedback control based on the motor current detected by current sensor 24.

Figure 8:
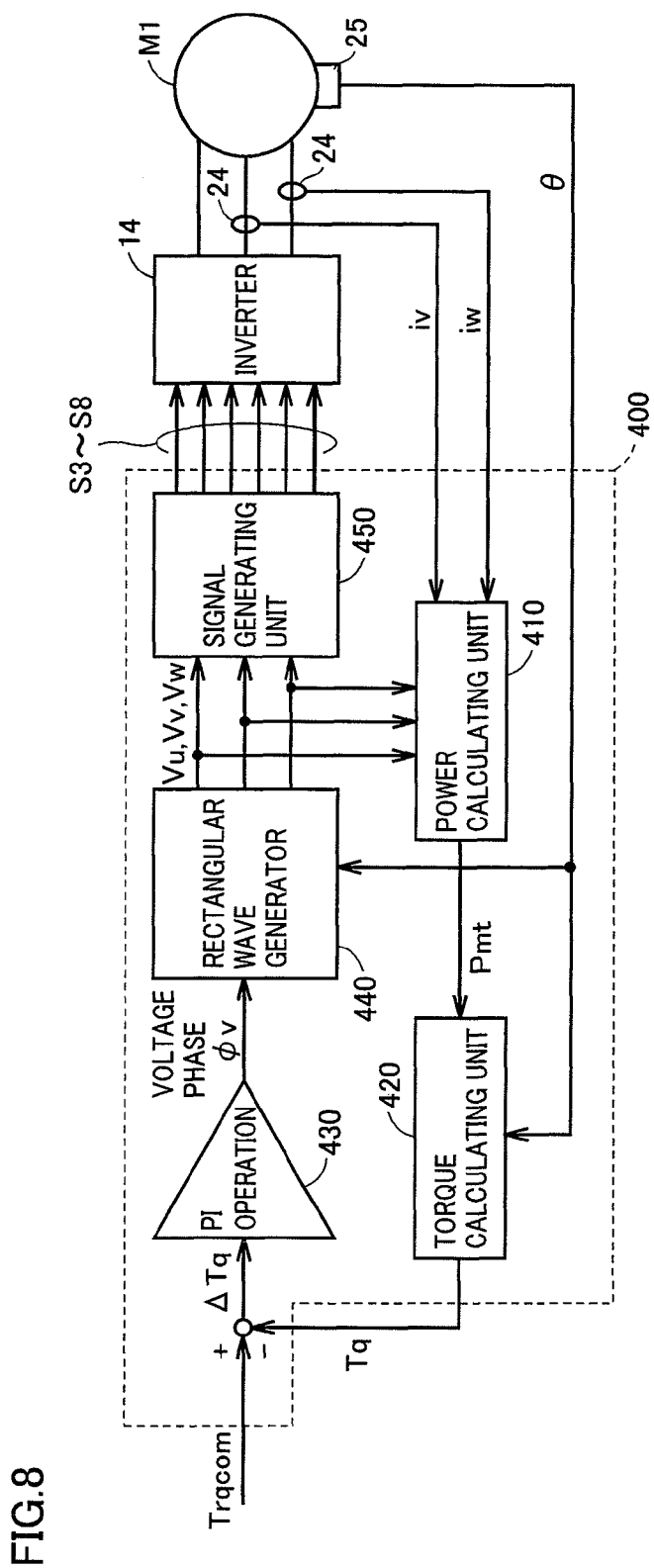
FIG. 8 is a functional block diagram showing a configuration of a rectangular wave voltage control unit 400.

FIG. 8 is a functional block diagram showing a configuration of rectangular wave voltage control unit 400.

Referring to FIG. 8, rectangular wave voltage control unit 400 includes a power calculating unit 410, a torque calculating unit 420, a PI calculating unit 430, a rectangular wave generator 440, and a signal generating unit 450.

Power calculating unit 410 calculates the electric power (motor power) Pmt supplied to the motor in accordance with Equation (1) below, based on the current of each phase calculated from V-phase current iv and W-phase current iw detected by current sensor 24 and the voltages Vu, Vv and Vw of respective phases (U-phase, V-phase and W-phase).

$$Pmt = iu \cdot Vu + iv \cdot Vv + iw \cdot Vw \qquad (1).$$

Torque calculating unit 420 calculates the estimated torque value Tq in accordance with Equation (2) below, using the motor power Pmt calculated by power calculating unit 410 and angular velocity ω calculated from the angle of rotation θ of AC electric motor M1 detected by rotation angle sensor 25.

$$Tq = Pmt/\omega \qquad (2).$$

PI calculating unit 430 receives a torque deviation ΔTq (ΔTq=Trqcom−Tq) from torque command value Trqcom. PI calculating unit 430 calculates a control deviation by executing a PI operation with a prescribed gain on torque deviation ΔTq. PI calculating unit 430 sets a phase φv of the rectangular wave voltage in accordance with the calculated control deviation. Specifically, when a positive torque is generated (Trqcom>0), PI calculating unit 430 advances the voltage phase if insufficient torque is applied and delays the voltage phase if excessive torque is applied. When a negative torque is generated (Trqcom<0), PI calculating unit 430 delays the voltage phase if insufficient torque is applied, and advances the voltage phase if excessive torque is applied.

Rectangular wave generator 440 generates voltage command values (rectangular wave pulses) Vu, Vv and Vw in accordance with the voltage phase φv set by PI calculating unit 430. Signal generating unit 450 generates switching control signals S3 to S8 in accordance with voltage command values Vu, Vv and Vw. Inverter 14 executes the switching operation in accordance with switching control signals S3 to S8, whereby the rectangular wave pulses in accordance with the voltage phase φv are applied as respective phase voltages of the motor.

As described above, when the rectangular wave voltage control is applied, motor torque can be controlled by feedback control of torque (electric power). It is noted, however, that in the PWM control method, the amplitude and phase of the motor-applied voltage are operable amounts, while in the rectangular wave voltage control method, the operable amount of motor-applied voltage is phase only. Therefore, when the rectangular wave voltage control is applied, control response becomes lower than when the PWM control method is applied.

In place of power calculating unit 410 and torque calculating unit 420, a torque sensor may be arranged. In that case, it becomes possible to calculate torque deviation ΔTq based on the value detected by the torque sensor.

Again referring to FIG. 4, voltage deviation calculating unit 320 calculates voltage deviations ΔVd and ΔVq by calculations of substituting d-axis current deviation ΔId and q-axis current deviation ΔIq to the motor voltage equations.

The motor voltage equations are given as Equations (3) and (4).

$$Vd = Ra \cdot Id - \omega \cdot Lq \cdot Iq \qquad (3)$$

$$Vq = \omega \cdot Ld \cdot Id + Ra \cdot Iq + \omega \cdot \phi \qquad (4).$$

In Equations (3) and (4), Ra represents armature winding resistance, ω represents electric angle of AC electric motor M1, and φ represents the number of interlinkage magnetic fluxes of the armature of permanent magnet. By substituting ΔId and ΔIq to Id and Iq in Equations (3) and (4), voltage deviation ΔVd and ΔVq can be represented in accordance with Equations (5) and (6) below, respectively.

$$\Delta Vd = Ra \cdot \Delta Id - \omega \cdot Lq \cdot \Delta Iq \qquad (5)$$

$$\Delta Vq = \omega \cdot Ld \cdot \Delta Id + Ra \cdot \Delta Iq + \omega \cdot \phi \qquad (6).$$

When the PWM control is executed, modulation factor calculating unit 340 calculates the modulation factor MD based on the voltage command values Vd# and Vq# calculated by PWM control unit 200 and the DC voltage VH (system voltage) detected by voltage sensor 13. Here, modulation factor calculating unit 340 calculates modulation factor MD in accordance with Equation (7) below.

$$MD = (Vd\#^2 - Vq\#^2)^{1/2}/VH \tag{7}$$

On the other hand, when the rectangular wave voltage control is executed, modulation factor is fixed at 0.78. When the rectangular wave voltage control is executed, modulation factor calculating unit 340 calculates the modulation factor used for determining whether or not switching from the rectangular wave voltage control to the PWM control is necessary by mode switching determination unit 360. The modulation factor here is a modulation factor (sort of a tentative modulation factor) used when the control mode is switched from the rectangular wave voltage control to the PWM control.

It is noted, however, that the modulation factor is constant when the rectangular wave voltage control is executed, as described above. Therefore, modulation factor calculating unit 340 calculates the tentative modulation factor using the voltage deviations ΔVd and ΔVq calculated by voltage deviation calculating unit 320 and the voltage command vector when the rectangular wave voltage control is executed.

Figure 9:
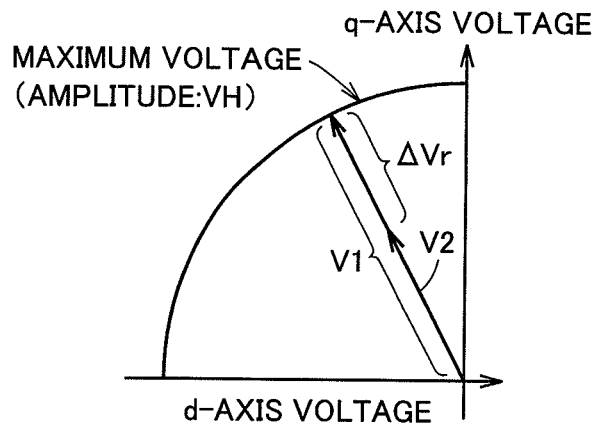
FIG. 9 illustrates a voltage command vector.

FIG. 9 illustrates a voltage command vector.

Referring to FIG. 9, on the d-q axes plane, the voltage command vector represented by a combination of voltage command values Vd# and Vq# rotates along a circumference of a circle with the origin being the center. In the rectangular wave voltage control, the amplitude of each phase voltage is fixed to the inverter input voltage VH. Therefore, in the rectangular wave voltage control, the radius of the circle mentioned above corresponds to the inverter input voltage (system voltage VH). When the rectangular wave voltage control is executed, an AC voltage command corresponding to the voltage command vector V1 of FIG. 9 is generated.

When the control mode is changed from the rectangular wave voltage control to the over modulation PWM control, the AC voltage command corresponding to the voltage command vector V2 is generated, by the control calculation by over modulation PWM control unit 201 (FIG. 7). Here, the voltage command vector V2 corresponds to the voltage command values Vd# and Vq# after the amplitude correction process is done by voltage amplitude correcting unit 270 of FIG. 7.

Voltage command value deviation ΔVr corresponds to the difference between a value representing the magnitude of voltage command vector V1 (hereinafter represented as Vr_VPH) and a value representing the magnitude of voltage command vector V2 (hereinafter represented as Vr). Voltage command deviation ΔVr is represented by Equation (8) below.

$$\Delta Vr = (\Delta Vd^2 + \Delta Vq^2)^{1/2} \tag{8}$$

Specifically, voltage command deviation ΔVr represents the magnitude of composite vector of d-axis voltage deviation ΔVd and q-axis voltage deviation ΔVq.

When the rectangular wave voltage control is executed, modulation factor calculating unit 340 calculates the magnitude Vr of voltage command vector V2 in accordance with Equation (9) below.

$$Vr = Vr\_VPH - \Delta Vr \tag{9}$$

Here, Vr_VPH is a fixed value. When the rectangular wave voltage control is executed, modulation factor calculating unit 340 calculates the modulation factor MD (tentative modulation factor) if the control mode is switched from the rectangular wave voltage control to the PWM control, in accordance with Equation (10) below.

$$MD = Vr \times k \tag{10}$$

The coefficient k is represented by Equation (11) below.

$$k = 0.78/Vr\_VPH \tag{11}$$

As the value Vr comes closer to Vr_VPH, the modulation factor MD calculated in accordance with Equations (10) and (11) comes closer to 0.78. On the other hand, as the value Vr becomes smaller, the modulation factor MD calculated in accordance with Equations (10) and (11) becomes smaller.

Mode switching determination unit 360 determines whether or not the modulation factor MD calculated in accordance with Equation (7) is not lower than a prescribed reference value MD1. If modulation factor MD is equal to or higher than the reference value MD1, mode switching determination unit 360 determines that switching from the PWM control to the rectangular wave voltage control is necessary. The result of determination is transmitted to modulation factor calculating unit 340 and mode selecting unit 380. Accordingly, modulation factor calculating unit 340 switches the equations used for calculating modulation factor MD from Equation (7) to Equations (10) and (11).

Mode switching determination unit 360 determines whether the modulation factor MD calculated in accordance with Equations (10) and (11) is not higher than a prescribed reference value MD2, when the rectangular wave voltage control is executed. The reference value MD2 is smaller than reference value MD1. If the modulation factor MD is equal to or lower than reference value MD2, mode switching determination unit 360 determines that switching from the rectangular wave voltage control to the PWM control is necessary. The result of determination is transmitted to modulation factor calculating unit 340 and mode selecting unit 380. Thus, modulation factor calculating unit 340 switches the equations used for calculating the modulation factor MD from Equations (10) and (11) to Equation (7).

When the PWM control mode is executed, mode switching determination unit 360 determines which of the sine wave PWM control and the over modulation PWM control is to be applied. The determination can be executed by comparing the modulation factor MD with a prescribed threshold value (for example, 0.61 as the theoretical maximum value of modulation factor for applying the sine wave PWM control). The result of determination is transmitted to modulation factor calculating unit 340 and mode selecting unit 380.

Mode selecting unit 380 selects the control mode for the inverter from the rectangular wave voltage control mode, the over modulation PWM control mode and the sine wave PWM control mode, based on the result of determination by mode switching determination unit 360.

Here, when the control mode is switched between the rectangular wave voltage control and the over modulation PWM control, the following problem related to control stability may possibly arise.

Figure 10:
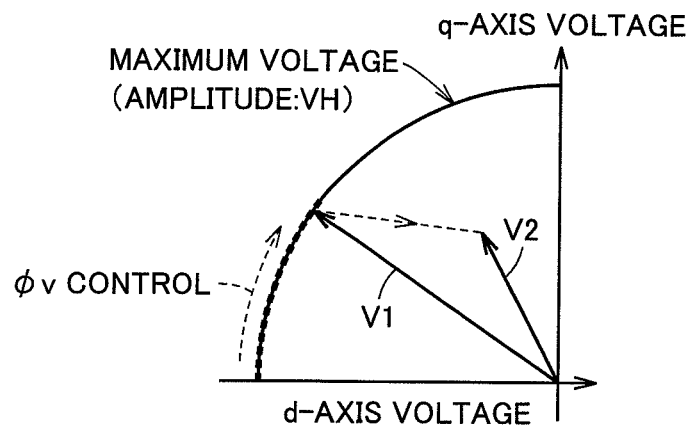
FIG. 10 illustrates a change of AC voltage command when the control mode is switched from the rectangular wave voltage control to the over modulation PWM control.

FIG. 10 illustrates a change of AC voltage command when the control mode is switched from the rectangular wave voltage control to the over modulation PWM control.

Referring to FIG. 10, when the rectangular wave voltage control is executed, the phase φv of voltage command vector V1 is controlled by torque deviation ΔTq (see FIG. 8). It is noted that voltage command vector V1 shown in FIG. 10 corresponds to the final value of the AC voltage command by the rectangular wave voltage control, at the time of switching from the rectangular wave voltage control to the over modulation PWM control.

When control mode transition from the rectangular wave voltage control to the over modulation PWM control occurs, by the control calculation of over modulation PWM control unit 201 (FIG. 7), the AC voltage command corresponding to voltage command vector V2 is generated. At the time of switching from the rectangular wave voltage control to the over modulation PWM control, the operable amounts used for torque control change significantly. Therefore, difference between voltage command vector V1 and voltage command vector V2 tends to be considerably large.

Figure 11:
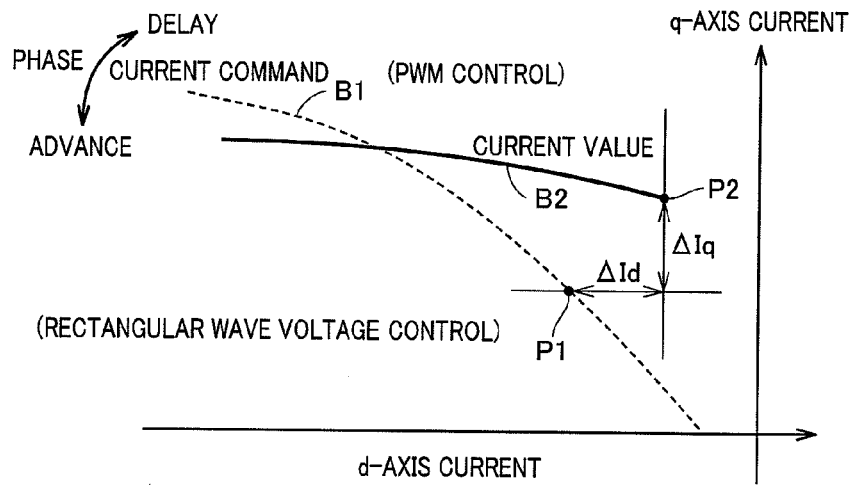
FIG. 11 illustrates a current command and a motor current value when the control mode is switched from the rectangular wave voltage control to the over modulation PWM control.

FIG. 11 illustrates a current command and a motor current value when the control mode is switched from the rectangular wave voltage control to the over modulation PWM control.

Referring to FIG. 11, a curve B1 on the d-q axes plane represents current command (Idcom, Iqcom) corresponding to a certain torque command value. A curve B2 on the d-q axes plane represents a motor current value when the torque represented by the curve B1 is generated from AC electric motor M1.

The d-q axes plane is divided by the curve B1 into the rectangular wave voltage control area and the PWM control area. The area in which the current phase is delayed from the current vector (reference current vector) corresponding to the curve B1 is the PWM control area. The area in which the current phase is advanced from the current vector is the rectangular wave voltage control area.

A point P1 on curve B1 represents the current command value determined by the torque command value. Specifically, the point P1 represents the current command value when the PWM control is executed. A point P2 on curve B2 represents the current value output from inverter 14 in accordance with the final value of AC voltage command under the rectangular wave voltage control.

In the present embodiment, by substituting current deviations $\Delta Id$ and $\Delta Iq$ to the motor voltage equations (see Equations (3) and (4)) representing a motor model, the difference between the voltage command corresponding to the torque command value and the voltage command corresponding to the final value of AC voltage command by the rectangular wave voltage control, that is, the voltage deviations $\Delta Vd$ and $\Delta Vq$ are calculated. Thus, the voltage deviations $\Delta Vd$ and $\Delta Vq$ can be calculated without using the voltage command values Vd# and Vq#.

The voltage command corresponding to the torque command value corresponds to the voltage command vector V2 shown in FIG. 10. On the other hand, the voltage command corresponding to the final value of AC voltage command by the rectangular wave voltage control corresponds to the voltage command vector V1 shown in FIG. 10.

Modulation factor calculating unit 340 calculates a voltage command deviation $\Delta Vr$, which indicates the change in magnitude of voltage command vector, based on voltage deviations $\Delta Vd$ and $\Delta Vq$ and Equation (8). Since the magnitude (Vr_VPH) of voltage command vector V1 is a fixed value, the magnitude of voltage command vector V2 can be calculated based on Vr_VPH and $\Delta Vr$.

Modulation factor calculating unit 340 calculates the modulation factor MD in accordance with Equation (10). Equation (10) indicates that modulation factor MD is in proportion to the magnitude (Vr) of voltage command vector V2. Since the modulation factor and the magnitude (Vr_VPH) of voltage command vector V1 when the rectangular wave control is executed are both fixed values, it is possible to calculate the modulation factor MD at the time of switching from the rectangular wave voltage control to the PWM control, by calculating the ratio of Vr with respect to Vr_VPH, assuming that the input voltage (DC voltage VH) to inverter 14 is constant.

The coefficient k given by Equation (11) is a constant value. Further, Vr_VPH is also a constant value. Therefore, in the present embodiment, by calculating $\Delta Vr$, it is possible to calculate the modulation factor MD at the time of switching from the rectangular wave voltage control to the PWM control.

(Switching of Control Mode)

Next, the determination of control mode switching between the rectangular wave voltage control and the PWM control will be described with reference to FIGS. 12 and 13.

Figure 12:
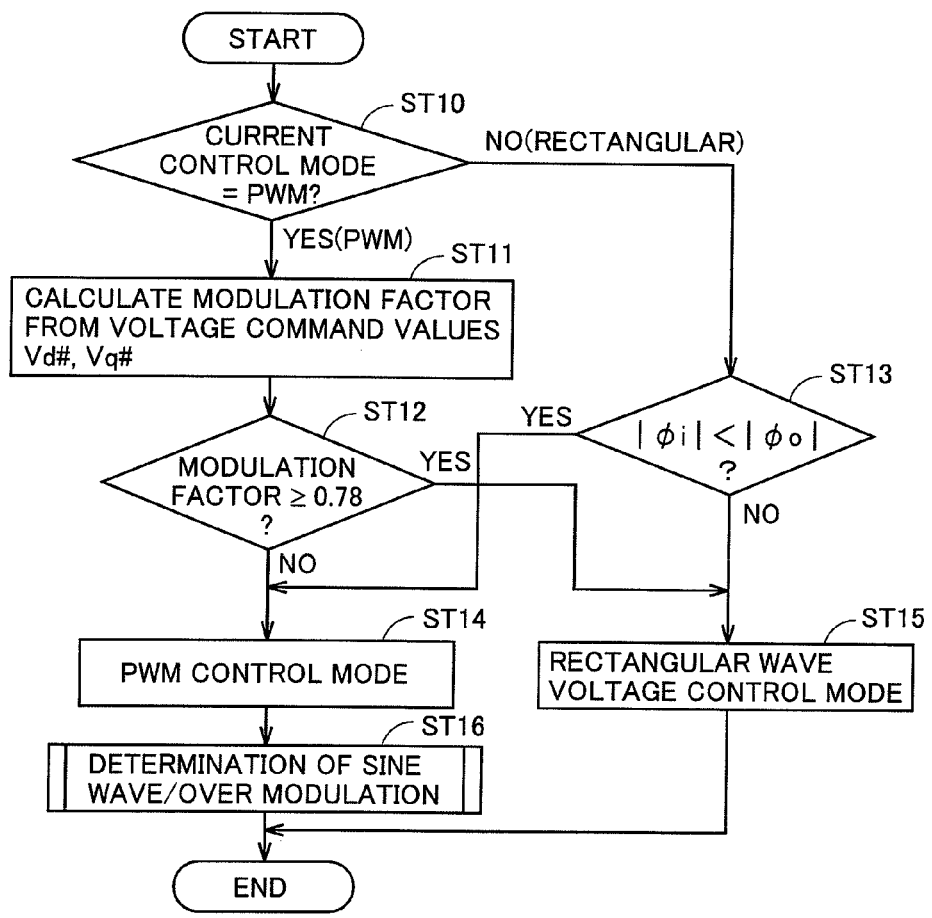
FIG. 12 is a flowchart representing an exemplary process for control mode switching determination.

FIG. 12 is a flowchart representing an exemplary process for control mode switching determination. In the process for control mode switching determination shown in FIG. 12, current phase is used for determining switching of control mode from the rectangular wave voltage control mode to the PWM control mode. The process shown in the flowchart of FIG. 12 is given as an example to be compared with the process for control mode switching determination in accordance with the present embodiment.

Referring to FIG. 12, at step ST10, whether or not the current control mode is the PWM control mode is determined. If the current control mode is determined to be the PWM control mode (YES at step ST10), the modulation factor is calculated based on the voltage command values Vd# and Vq# in accordance with the PWM control mode and the system voltage VH (step ST11). By way of example, the modulation factor MD is calculated in accordance with Equation (7) above.

Next, at step ST12, whether or not the modulation factor calculated at step ST11 is equal to or higher than 0.78 is determined. If the modulation factor is determined to be higher than 0.78 (YES at step ST12), it means that an appropriate AC voltage cannot be generated in the PWM control mode and, therefore, the control mode is switched and the rectangular wave voltage control mode is selected (step ST15).

On the other hand, if the modulation factor is determined to be smaller than 0.78 (NO at step ST12), the PWM control mode is continuously selected (step ST14).

If the current control mode is determined to be the rectangular wave voltage control mode (NO at step ST10), whether or not the absolute value of AC current phase (actual current phase) $\phi i$ supplied from inverter 14 to AC electric motor M1 becomes smaller than the absolute value of prescribed switching current phase 40 is determined (step ST13). The switching current phase $\phi 0$ may be set to different values when AC electric motor M1 is in power drive and when it is in regenerative operation.

If the absolute value of actual current phase $\phi i$ is determined to be smaller than the absolute value of switching current phase $\phi 0$ (YES at step ST13), the control mode is switched from the rectangular wave voltage control mode to the PWM control. Therefore, the PWM control mode is selected (step ST14).

If the absolute value of actual current phase is determined to be not smaller than the absolute value of switching current phase $\phi 0$ (NO at step ST13), the rectangular wave voltage control mode is maintained as the control mode (step ST15).

When the PWM control mode is selected (step ST14), which of the sine wave PWM control and the over modulation PWM control is to be applied is determined (step ST16). The determination may be executed by comparing the modulation factor MD with a prescribed threshold value (for example, the theoretical maximum value of 0.61 of the modulation factor for applying the sine wave PWM control).

If the modulation factor is not higher than the threshold value, the sine wave PWM control is applied. If the modulation factor is not higher than the threshold value mentioned above, the PWM control in which the amplitude of AC voltage command 264 (sinusoidal component) is not larger than the amplitude of carrier wave 262 can be realized. On the contrary, if the modulation factor is higher than the threshold value mentioned above, the over modulation PWM control is applied. In this case, the amplitude of AC voltage command 264 (sinusoidal component) becomes larger than the amplitude of carrier wave 262.

In the process shown in FIG. 12, when transition from the PWM control mode to the rectangular wave voltage control mode is determined, the modulation factor is used, and when transition from the rectangular wave voltage control mode to the PWM control mode is determined, the actual current phase ϕi is used. Since a plurality of different types of parameters are used for determining switching of control modes, the determination process becomes complicated.

Figure 13:
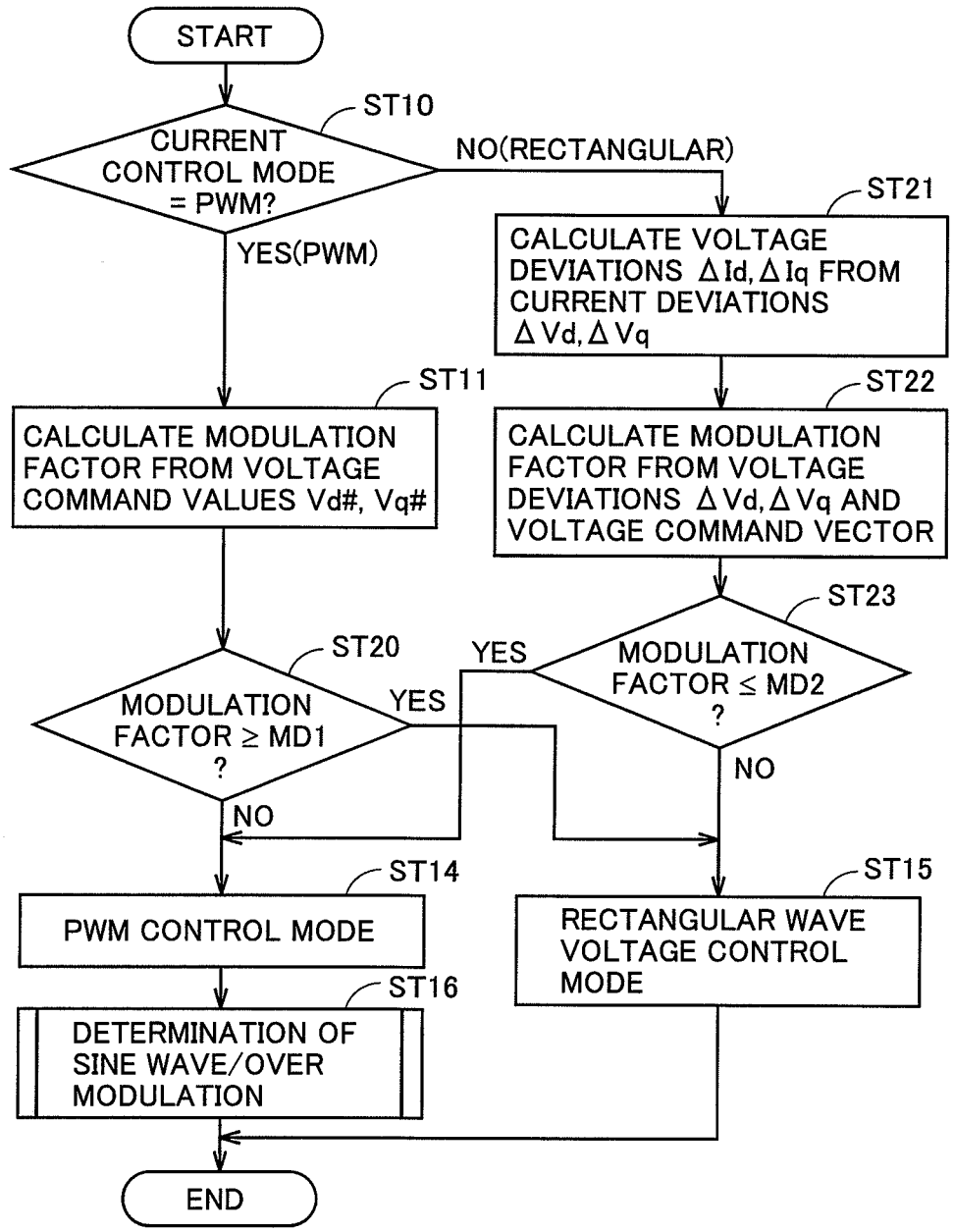
FIG. 13 is a flowchart representing the process for control mode switching determination in accordance with an embodiment.

FIG. 13 is a flowchart representing the process for control mode switching determination in accordance with an embodiment of the present invention. Referring to FIGS. 13 and 12, the process for determining control mode switching in accordance with the present embodiment is different from the process shown in FIG. 12 in that the process of steps ST20 and ST23 is executed in place of the process of steps ST12 and ST13, and that the process of steps ST21 and ST22 is added. Other process steps shown in FIG. 13 are the same as the corresponding process steps shown in FIG. 12. Therefore, in the following, the process of steps ST20 to ST23 will be mainly described. The process shown in FIG. 13 is executed, for example, at every constant period, by controller 30.

At step ST10, controller 30 determines whether or not the current control mode is the PWM control mode. If the current control mode is determined to be the PWM control mode (YES at step ST10), controller 30 (modulation factor calculating unit 340) calculates the modulation factor in accordance with Equation (7) above, based on the voltage command values Vd# and Vq# in accordance with the PWM control mode and the system voltage VH (step ST11).

Next, at step ST20, controller 30 (mode switching determination unit 360) determines whether or not the modulation factor MD calculated at step ST11 is equal to or higher than the reference value MD1. If the modulation factor MD is equal to or higher than MD1 (YES at step ST20), controller 30 (mode switching determination unit 360 and mode selecting unit 380) switches the control mode from the PWM control to the rectangular wave control mode (step ST15).

On the other hand, if the modulation factor MD calculated at step ST11 is determined to be smaller than the reference value MD1 (NO at step ST20), the PWM control mode is continuously selected (step ST14).

If the current control mode is determined to be the rectangular wave voltage control mode (NO at step ST10), controller 30 (voltage deviation calculating unit 320) calculates voltage deviations ΔVd and ΔVq from current deviations ΔId and ΔIq calculated by PWM control unit 200 (step ST21). As described above, voltage deviation calculating unit 320 calculates voltage deviations ΔVd and ΔVq by substituting current deviations ΔId and ΔIq to Equations (5) and (6).

Next, controller 30 (modulation factor calculating unit 340) calculates the modulation factor MD based on the voltage deviations ΔVd and ΔVq calculated at step ST21 and the voltage command vector V1 (step ST22). Modulation factor calculating unit 340 calculates the modulation factor MD in accordance with Equations (8) to (10) described above.

Thereafter, controller 30 (mode switching determination unit 360) determines whether or not the modulation factor MD calculated at step ST22 is equal to or smaller than the reference value MD2 (step ST23). If the modulation factor MD is determined to be smaller than the reference value MD2 (YES at step ST23), controller 30 (mode switching determination unit 360) determines that switching from the rectangular wave voltage control mode to the PWM control is necessary. Thus, the PWM control mode is selected (step ST14).

If the modulation factor MD is determined to be larger than the reference value MD2 (NO at step ST23), controller 30 (mode switching determination unit 360) determines that switching from the rectangular wave voltage control mode to the PWM control is unnecessary. Therefore, the rectangular wave voltage control mode is maintained as the control mode (step ST15).

When the PWM control mode is selected (step ST14), controller 30 (mode switching determination unit 360) determines which of the sine wave PWM control and the over modulation PWM control is to be applied (step ST16). Controller 30 (mode switching determination unit 360) determines which of the sine wave PWM control and the over modulation PWM control is to be applied by comparing the modulation factor MD with the maximum modulation factor (0.61) in the sine wave PWM control mode.

As described above, in the present embodiment, by calculating ΔVr, the modulation factor MD when the rectangular wave voltage control is switched to the PWM control can be calculated. Therefore, according to the present embodiment, the modulation factor MD when the rectangular wave voltage control is switched to the PWM control can easily be calculated. Since the modulation factor MD can easily be calculated, whether or not switching of control mode from the rectangular wave voltage control to the PWM control is necessary can be determined based simply on the modulation factor MD. Thus, determination as to whether the switching of control mode from the rectangular wave voltage control to the PWM control is necessary can be made easily.

Further, according to the present embodiment, the control mode can be switched to and from the PWM control mode and the rectangular wave voltage control mode, based only on the modulation factor. This avoids complication of the determination as to whether switching of control mode is necessary.

Reference value MD2 may be equal to reference value MD1. It is preferred, however, that reference value MD2 is made smaller than reference value MD1. By setting the reference value MD2 smaller than the reference value MD1, hysteresis regarding the switching of control mode can be set. This prevents occurrence of hunting at the time of control mode switching. By preventing hunting, quick switching of control mode becomes possible. In the present embodiment, hysteresis can be set easily and, therefore, the control mode can quickly be switched.

Further, according to the present embodiment, when the rectangular wave voltage control is executed, the current deviation between the current command in accordance with the torque command and the motor current value (actual current value) corresponding to the final value of AC voltage command by the rectangular wave voltage control is used for calculating the modulation factor. If the modulation factor is smaller than the reference value MD2, necessity of switching from the rectangular wave voltage control and the PWM control (over modulation PWM control) is determined.

Therefore, it is possible to determine the reference value MD2 such that the current deviation at the time of switching from the rectangular wave voltage control to the PWM control (over modulation PWM control) becomes small.

When the PWM control is executed, the current deviation is used for generating the voltage command. Specifically, when the PWM control is executed, an AC voltage command is generated to make the current deviation 0. Since the current deviation immediately after the control mode is switched from the rectangular wave voltage control to the PWM control is made small, significant change in the AC voltage command can be prevented. This prevents overshoot at the start of PWM control (current feedback control) and, therefore, instability of control of AC electric motor M1 immediately after the switching from the rectangular wave voltage control to the PWM control (such as abrupt change in torque) can be avoided.

(Exemplary Configuration of Electric Vehicle)

Figure 14:
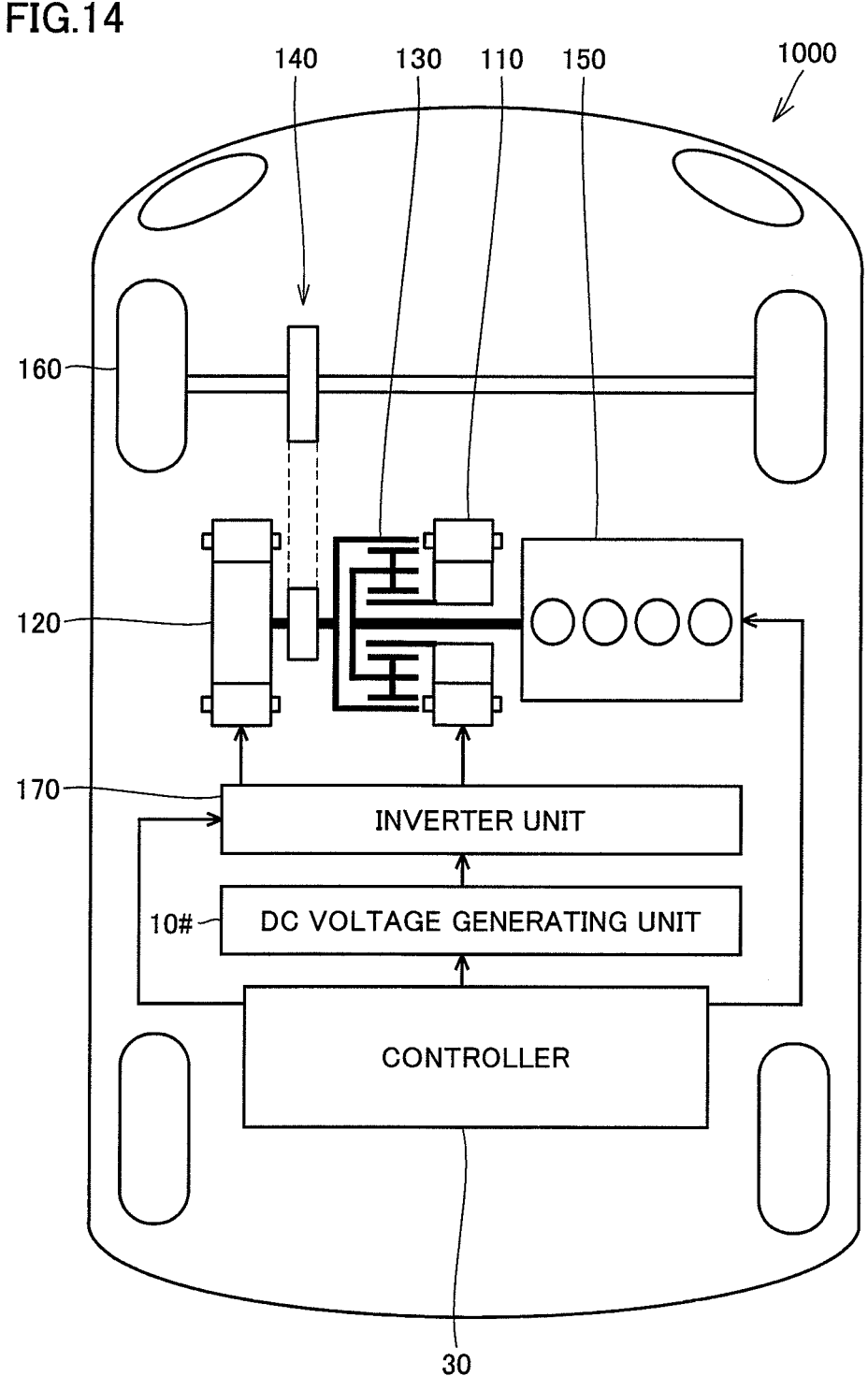
FIG. 14 is a block diagram showing an example of an electric powered vehicle to which the motor drive control system shown in FIG. 1 is applied.

FIG. 14 is a block diagram showing an example of an electric powered vehicle to which the motor drive control system shown in FIG. 1 is applied. Referring to FIGS. 14 and 1, a hybrid vehicle 1000 includes an engine 150, a first MG (Motor Generator) 110, a second MG 120, a power split device 130, a reduction gear 140, controller 30, a DC voltage generating unit 10#, an inverter unit 170, and a driving wheel 160.

Engine 150 and first and second MGs 110 and 120 are coupled to power split device 130. Hybrid vehicle 1000 runs by the driving force from at least one of engine 150 and second MG 120. The power generated by engine 150 is divided to two paths, by power split device 130. Specifically, one path transmits the power through reduction gear 140 to driving wheel 160, and the other path to the first MG 110.

The first and second MGs 110 and 120 are both motor generators described above, that is, the AC electric motors. AC electric motor M1 shown in FIG. 1 is applicable both to the first and second MGs 110 and 120. Further, inverter unit 170 includes two inverters (corresponding to inverter 14 shown in FIG. 1) for controlling driving of first and second MGs 110 and 120, respectively.

The first MG 110 generates electric power using the power of engine 150 split by power split device 130. By way of example, if a value representing the state of charge (SOC) of DC power source B becomes lower than a predetermined value, engine 150 starts and electric power is generated by the first MG 110. The electric power generated by the first MG 110 is converted from AC to DC by inverter unit 170, has its voltage regulated by converter 12, and stored in DC power source B. Further, the first MG 110 starts engine 150 using the electric power stored in DC power source B.

The second MG 120 generates driving force using at least one of the electric power stored in DC power source B and the electric power generated by the first MG 110. The driving force of second MG 120 is transmitted through reduction gear 140 to driving wheel 160. In this manner, the second MG 120 assists engine 150 and causes the vehicle to run with the driving force from the second MG 120. In FIG. 14, driving wheel 160 is shown as the front wheel. It is noted, however, that the second MG 120 may drive the rear wheel in place of or in addition to the front wheel.

At the time of braking of hybrid vehicle 1000, the second MG 120 is driven by driving wheel 160 through reduction gear 140, and the second MG 120 functions as a generator. Thus, the second MG 120 functions as a regenerative brake converting the braking energy to electric power. The electric power generated by the second MG 120 is stored in DC power source B.

Power split device 130 is formed of a planetary gear including a sun gear, a pinion gear, a carrier and a ring gear. The pinion gear engages with the sun gear and the ring gear. The carrier supports the pinion gear to allow rotation, and coupled to a crank shaft of engine 150. The sun gear is coupled to the rotation shaft of first MG 110. The ring gear is coupled to the rotation shaft of second MG 120 and reduction gear 140.

As engine 150 and first and second MGs 110 and 120 are coupled through power split device 130 formed of the planetary gear, the numbers of rotations of engine 150 and the first and second MGs 110 and 120 satisfy a relation connected by straight lines in a collinear diagram.

Controller 30 controls engine 150, DC voltage generating unit 10# and inverter unit 170. As controller 30 controls inverter unit 170, the first and second MGs 110 and 120 are controlled.

Though a hybrid vehicle has been described as an example of an electric powered vehicle, the present invention is applicable to an automobile in which vehicle driving power is generated by electric energy, such as an electric vehicle or a fuel cell vehicle. These electric powered vehicles have a motor mounted thereon for generating torque to drive the driving wheel. The AC electric motor can be adopted as the motor. Therefore, the present invention is applicable to the electric powered vehicles mentioned above.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A controller for an AC electric motor, wherein an applied voltage applied to said AC electric motor is controlled by an inverter converting a DC voltage to said applied voltage;

said controller comprising:

a current detector detecting a motor current flowing between said inverter and said AC electric motor;

a pulse width modulation control unit generating, based on a current deviation between said motor current detected by said current detector and a current command corresponding to an operation command of said AC electric motor, an AC voltage command causing said AC electric motor to operate in accordance with said operation command, and generating, by pulse width modulation control based on a comparison between said AC voltage command and a carrier wave, a control command for said inverter;

a rectangular wave voltage control unit generating said control command for said inverter, by rectangular wave voltage control controlling said applied voltage such that said applied voltage comes to be a rectangular wave voltage having a phase in accordance with said operation command, based on said motor current detected by said current detector and said operation command of said AC electric motor;

a voltage deviation calculating unit calculating, by executing an operation of substituting said current deviation to a voltage equation of said AC electric motor, a voltage deviation between a first voltage command corresponding to said AC voltage command when said rectangular wave voltage control is executed and a second voltage command corresponding to said AC voltage command when said pulse width modulation control is executed;

a modulation factor calculating unit calculating a first control value representing a modulation factor defined as a ratio of an effective value of said applied voltage with respect to said DC voltage, based on said first voltage command and said voltage deviation; and a mode switching determination unit determining, when said rectangular wave voltage control is being executed by said rectangular wave voltage control unit, based on said first control value, whether or not switching of control mode of said AC electric motor from said rectangular wave voltage control to said pulse width modulation control is necessary.

2. The controller for an AC electric motor according to claim 1, wherein said current deviation includes a d-axis current deviation and a q-axis current deviation;

said voltage deviation calculating unit calculates said voltage deviation including a d-axis voltage deviation and a q-axis voltage deviation, by executing an operation of substituting said d-axis current deviation and said q-axis current deviation to said voltage equation; and said modulation factor calculating unit calculates, by subtracting a correction value representing a magnitude of a composite vector of said d-axis voltage deviation and said q-axis voltage deviation from a first value representing a magnitude of a voltage vector corresponding to said first voltage command, a second value representing a magnitude of a voltage vector corresponding to said second voltage command, and based on a ratio of said second value with respect to said first value and on the value of said modulation factor when said rectangular wave voltage control is executed, calculates said first control value.

3. The controller for an AC electric motor according to claim 2, wherein said modulation factor calculating unit calculates, based on said second voltage command and said DC voltage value, a second control value representing said modulation factor when said pulse width modulation control is being executed by said pulse width modulation control unit MO); and said mode switching determination unit determines, based on said second control value, whether or not switching of control mode from said pulse width modulation control to said rectangular wave voltage control is necessary.

4. The controller for an AC electric motor according to claim 3, wherein said mode switching determination unit determines that switching from said rectangular wave voltage control to said pulse width modulation control is necessary when said first control value is smaller than a first reference value, and determines that switching from said pulse width modulation control to said rectangular wave voltage control is necessary when said second control value is larger than a second reference value; and said first reference value is smaller than said second reference value.

5. The controller for an AC electric motor according to claim 1, wherein said pulse width modulation control unit generates said second voltage command such that said current deviation becomes closer to 0.

6. The controller for an AC electric motor according to claim 1, wherein said pulse width modulation control unit includes a first control unit generating said control command in accordance with said current deviation, by sine wave pulse width modulation method, and a second control unit generating said control command in accordance with said current deviation, by over modulation pulse width modulation method for outputting said applied voltage having larger fundamental wave component than said sine wave pulse width modulation method.

7. An electric powered vehicle, comprising:

an AC electric motor;

an inverter converting a DC voltage to an applied voltage applied to said AC electric motor and controlling said applied voltage; and a controller controlling said inverter, said controller including a current detector detecting a motor current flowing between said inverter and said AC electric motor, a pulse width modulation control unit generating, based on a current deviation between said motor current detected by said current detector and a current command corresponding to an operation command of said AC electric motor, an AC voltage command causing said AC electric motor to operate in accordance with said operation command, and generating, by pulse width modulation control based on a comparison between said AC voltage command and a carrier wave, a control command for said inverter, a rectangular wave voltage control unit generating said control command for said inverter, by rectangular wave voltage control controlling said applied voltage such that said applied voltage comes to be a rectangular wave voltage having a phase in accordance with said operation command, based on said motor current detected by said current detector and said operation command of said AC electric motor, a voltage deviation calculating unit calculating, by executing an operation of substituting said current deviation to a voltage equation of said AC electric motor, a voltage deviation between a first voltage command corresponding to said AC voltage command when said rectangular wave voltage control is executed and a second voltage command corresponding to said AC voltage command when said pulse width modulation control is executed, a modulation factor calculating unit calculating a first control value representing a modulation factor defined as a ratio of an effective value of said applied voltage with respect to said DC voltage, based on said first voltage command and said voltage deviation, and a mode switching determination unit determining, when said rectangular wave voltage control is being executed by said rectangular wave voltage control unit, based on said first control value, whether or not switching of control mode of said AC electric motor from said rectangular wave voltage control to said pulse width modulation control is necessary.

8. The electric powered vehicle according to claim 7, wherein said current deviation includes a d-axis current deviation and a q-axis current deviation;

said voltage deviation calculating unit calculates said voltage deviation including a d-axis voltage deviation and a q-axis voltage deviation, by executing an operation of substituting said d-axis current deviation and said q-axis current deviation to said voltage equation; and said modulation factor calculating unit calculates, by subtracting a correction value representing a magnitude of a composite vector of said d-axis voltage deviation and said q-axis voltage deviation from a first value representing a magnitude of a voltage vector corresponding to said first voltage command, a second value representing a magnitude of a voltage vector corresponding to said second voltage command, and based on a ratio of said second value with respect to said first value and on the value of said modulation factor when said rectangular wave voltage control is executed, calculates said first control value.

9. The electric powered vehicle according to claim 8, wherein said modulation factor calculating unit calculates, based on said second voltage command and said DC voltage value, a second control value representing said modulation factor when said pulse width modulation control is being executed by said pulse width modulation control unit; and said mode switching determination unit determines, based on said second control value, whether or not switching of control mode from said pulse width modulation control to said rectangular wave voltage control is necessary.

10. The electric powered vehicle according to claim 9, wherein said mode switching determination unit (3-60) determines that switching from said rectangular wave voltage control to said pulse width modulation control is necessary when said first control value is smaller than a first reference value, and determines that switching from said pulse width modulation control to said rectangular wave voltage control is necessary when said second control value is larger than a second reference value; and said first reference value is smaller than said second reference value.

11. The electric powered vehicle according to claim 7, wherein said pulse width modulation control unit generates said second voltage command such that said current deviation becomes closer to 0.

12. The electric powered vehicle according to claim 7, wherein said pulse width modulation control unit includes a first control unit generating said control command in accordance with said current deviation, by sine wave pulse width modulation method, and a second control unit generating said control command in accordance with said current deviation, by over modulation pulse width modulation method for outputting said applied voltage having larger fundamental wave component than said sine wave pulse width modulation method.

* * * * *